(12) United States Patent
Tan et al.

(10) Patent No.: US 11,095,802 B2
(45) Date of Patent: Aug. 17, 2021

(54) METHOD FOR PROCESSING A CAPTURED IMAGE AND ELECTRONIC DEVICE

(71) Applicant: GUANGDONG OPPO MOBILE TELECOMMUNICATIONS CORP., LTD., Guangdong (CN)

(72) Inventors: Guohui Tan, Guangdong (CN); Haitao Zhou, Guangdong (CN); Xiao Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/678,701

(22) Filed: Nov. 8, 2019

(65) Prior Publication Data
US 2020/0077003 A1 Mar. 5, 2020

Related U.S. Application Data

(63) Continuation of application No. PCT/CN2019/080427, filed on Mar. 29, 2019.

(30) Foreign Application Priority Data

Apr. 28, 2018 (CN) .......................... 201810401344.1
Apr. 28, 2018 (CN) .......................... 201810404282.X

(51) Int. Cl.
*H04N 5/232* (2006.01)
*H04N 5/067* (2006.01)
*H04N 5/247* (2006.01)

(52) U.S. Cl.
CPC ............. *H04N 5/232* (2013.01); *H04N 5/067* (2013.01); *H04N 5/247* (2013.01)

(58) Field of Classification Search
CPC ........ H04N 5/232; H04N 5/067; H04N 5/247; H04N 5/23245; H04N 9/045; H04N 5/33;
(Continued)

(56) References Cited

U.S. PATENT DOCUMENTS

2003/0133018 A1 7/2003 Ziemkowski
2005/0280702 A1 12/2005 Nakano et al.
(Continued)

FOREIGN PATENT DOCUMENTS

CN 1710935 A 12/2005
CN 101520635 A 9/2009
(Continued)

OTHER PUBLICATIONS

OA with English translation for CN application 201810401344.1, dated May 7, 2019.
(Continued)

*Primary Examiner* — Gevell V Selby
(74) *Attorney, Agent, or Firm* — Young Basile Hanlon & MacFarlane, P.C.

(57) ABSTRACT

The present disclosure provides a method and an apparatus for controlling image capturing, and an electronic device. The method includes: a second processing unit controlling a second camera to collect a second image according to a data obtaining request and sending an image collection instruction to a first processing unit in response to receiving the data obtaining request; the second processing unit obtaining exposure time periods of the first camera and the second camera in response to receiving a synchronization signal sent by the second camera; the second processing unit calculating a delay time period according to the exposure time periods; the second processing unit forwarding the synchronization signal to the first camera in response to a time period of receiving the synchronization signal reaching (Continued)

the delay time period; and the first processing unit processing the first image, and sending the processed first image to the second processing unit.

18 Claims, 10 Drawing Sheets

(58) Field of Classification Search
CPC ............ G06K 9/6202; G06K 9/00228; G06K 9/00288; G06K 9/2018
See application file for complete search history.

(56) References Cited

U.S. PATENT DOCUMENTS

| | | | |
|---|---|---|---|
| 2012/0188404 A1 | 7/2012 | Muukki et al. | |
| 2012/0194712 A1* | 8/2012 | Crook ................... | H04N 5/247 348/262 |
| 2014/0362246 A1* | 12/2014 | Nakano .............. | H04N 5/23206 348/211.4 |
| 2015/0281541 A1* | 10/2015 | Hataguchi ............ | H04N 5/2351 348/362 |
| 2016/0316110 A1 | 10/2016 | Ross et al. | |
| 2017/0061210 A1 | 3/2017 | Ollila | |
| 2018/0061056 A1 | 3/2018 | Zhao et al. | |
| 2019/0110039 A1* | 4/2019 | Linde ................... | H04N 5/243 |

FOREIGN PATENT DOCUMENTS

| | | |
|---|---|---|
| CN | 201608788 U | 10/2010 |
| CN | 101431603 B | 4/2011 |
| CN | 102129152 A | 7/2011 |
| CN | 102810139 A | 12/2012 |
| CN | 103338334 A | 10/2013 |
| CN | 103416071 A | 11/2013 |
| CN | 107004273 A | 8/2017 |
| CN | 107040726 A | 8/2017 |
| CN | 107395998 A | 11/2017 |
| CN | 107424187 A | 12/2017 |
| CN | 107730561 A | 2/2018 |
| CN | 104486557 B | 4/2018 |
| CN | 107870080 A | 4/2018 |
| CN | 107948463 A | 4/2018 |
| CN | 108419017 A | 8/2018 |
| CN | 108650472 A | 10/2018 |
| JP | 2000341719 A | 12/2000 |
| WO | 2018072713 A1 | 4/2018 |
| WO | 2018194759 A1 | 10/2018 |

OTHER PUBLICATIONS

OA with English translation for CN application 201810404282.X, dated Mar. 5, 2019.
OA with English translation for CN application 201810401344.1, dated Jul. 5, 2019.
ISR with English translation for PCT application PCT/CN2019/080427, dated Jul. 2, 2019.
CN Office Action with English translation of application 202010004323.3 dated Dec. 24, 2020.
Extended European Search Report for EP application 19791777.6 dated Feb. 23, 2021.
India OA for IN application 201917054446 dated Mar. 19, 2021.

* cited by examiner

METHOD FOR PROCESSING A CAPTURED IMAGE AND ELECTRONIC DEVICE

CROSS-REFERENCE TO RELATED APPLICATION(S)

This application is a continuation of International Application No. PCT/CN2019/080427, filed on Mar. 29, 2019, which claims priority to Chinese Patent Application Nos. 201810401344.1 and 201810404282.X, both filed on Apr. 28, 2018, the entire contents of all of which are incorporated herein by reference in their entireties.

TECHNICAL FIELD

Embodiments of the present disclosure relate to a field of computer technology, and more particularly to a method and an apparatus for controlling image capturing, an electronic device, and a computer readable storage medium.

BACKGROUND

With rapid development of imaging technology on intelligent terminals, more and more intelligent terminals are installed with two or more cameras, and capture images with better visual effect by interworking of the multiple cameras.

SUMMARY

Embodiments of the present disclosure provide a method and an apparatus for controlling image capturing, an electronic device, and a computer readable storage medium.

A method for controlling image capturing includes: controlling, by a second processing unit, a second camera to collect a second image according to a data obtaining request, and sending, by the second processing unit, an image collection instruction to a first processing unit, in response to the second processing unit receiving the data obtaining request, the image collection instruction being configured to instruct the first processing unit to control a first camera to collect a first image; obtaining, by the second processing unit, a first exposure time period of the first camera and a second exposure time period of the second camera in response to the second processing unit receiving a synchronization signal, the synchronization signal being a signal sent by the second camera at an exposure start time in response to the second camera collecting the second image; calculating, by the second processing unit, a delay time period according to the first exposure time period and the second exposure time period; forwarding, by the second processing unit, the synchronization signal to the first camera in response to a time period of the receiving the synchronization signal reaching the delay time period, the synchronization signal being configured to instruct the first camera to start exposure and collect the first image; and processing the first image by the first processing unit, and sending the processed first image to the second processing unit.

An electronic device includes a first processing unit, a second processing unit and a camera module. The first processing unit is coupled to the second processing unit and the camera module respectively. The camera module includes a first camera and a second camera. The first processing unit is coupled to the first camera through a control line. The second processing unit is coupled to the second camera through a control line. The first processing unit is coupled to the second processing unit. The second processing unit is coupled to the first camera and the second camera respectively through a signal line. The second processing unit is configured to control the second camera to collect a second image according to a data obtaining request, and send an image collection instruction to the first processing unit, in response to receiving the data obtaining request. The first processing unit is configured to control the first camera to collect a first image according to the image collection instruction. The second camera is configured to send a synchronization signal to the second processing unit at an exposure start time in response to the second camera collecting the second image. The second processing unit is further configured to obtain a first exposure time period of the first camera and a second exposure time period of the second camera in response to receiving the synchronization signal sent by the second camera, and to calculate a delay time period according to the first exposure time period and the second exposure time period. The second processing unit is further configured to forward the synchronization signal to the first camera in response to a time period of receiving the synchronization signal reaching the delay time period. The first camera is configured to start exposure and to collect the first image according to the synchronization signal. The first processing unit is further configured to process the first image and to send the processed first image to the second processing unit.

A method for controlling image capturing includes: controlling, by a first processing unit, a first camera to collect a first image according to an image collection instruction in response to receiving the image collection instruction, the image collection instruction being sent by the second processing unit in response to receiving a data obtaining request, and the data obtaining request being configured to instruct the second processing unit to control a second camera to collect a second image; obtaining, by the first processing unit, a first exposure time period of the first camera and a second exposure time period of the second camera in response to receiving a synchronization signal, the synchronization signal being a signal sent by the second camera at an exposure start time in response to the second camera collecting the second image; calculating, by the first processing unit, a delay time period according to the first exposure time period and the second exposure time period; forwarding, by the first processing unit, the synchronization signal to the first camera in response to a time period of receiving the synchronization signal reaching the delay time period, the synchronization signal being configured to instruct the first camera to start exposure and collect the first image; and processing the first image by the first processing unit, and sending the processed first image to the second processing unit.

An electronic device includes a first processing unit, a second processing unit and a camera module. The first processing unit is coupled to the second processing unit and the camera module respectively. The camera module includes a first camera and a second camera. The first processing unit is coupled to the first camera through a control line. The second processing unit is coupled to the second camera through a control line. The first processing unit is coupled to the second processing unit. The first processing unit is coupled to the first camera and the second camera respectively through a signal line. The second processing unit is configured to, in response to receiving a data obtaining request, control a second camera to collect a second image according to the data obtaining request and send an image collection instruction to the first processing unit. The first processing unit is configured to control the first camera to collect the first image according to the image collection instruction in response to receiving the image collection instruction sent by the second processing unit. The second camera is configured to send a synchronization signal to the first processing unit at an exposure start time in response to collecting the second image. The first processing unit is further configured to obtain a first exposure time period of the first camera and a second exposure time period of the second camera in response to receiving the synchronization signal sent by the second camera. The first processing unit is further configured to calculate a delay time period according to the first exposure time period and the second exposure time period. The first processing unit is further configured to forward the synchronization signal to the first camera in response to a time period of receiving the synchronization signal reaching the delay time period. The first camera is configured to start exposure and to collect the first image according to the synchronization signal. The first processing unit is further configured to process the first image and to send the processed first image to the second processing unit.

A computer readable storage medium has a computer program stored thereon. The computer program is configured to implement the method for controlling image capturing described above when executed by a processor.

DETAILED DESCRIPTION

In order to make objectives, technical solutions and advantages of the present disclosure clearer, the present disclosure will be further illustrated in detail in combination with accompanying drawings and embodiments hereinafter. It should be understood that, detailed embodiments described herein are intended to explain the present disclosure, which are not limited to the present disclosure.

It should be understood that, although terms "first", "second" and the like may be used herein to describe various elements, these elements should not be limited by these terms. These terms are only used to distinguish one element from another. For example, without departing from the scope of the present disclosure, a first client may be called as a second client, and similarly, the second client may be called as the first client. Both the first client and the second client are clients, but not the same client.

First Implementation

Figure 1:
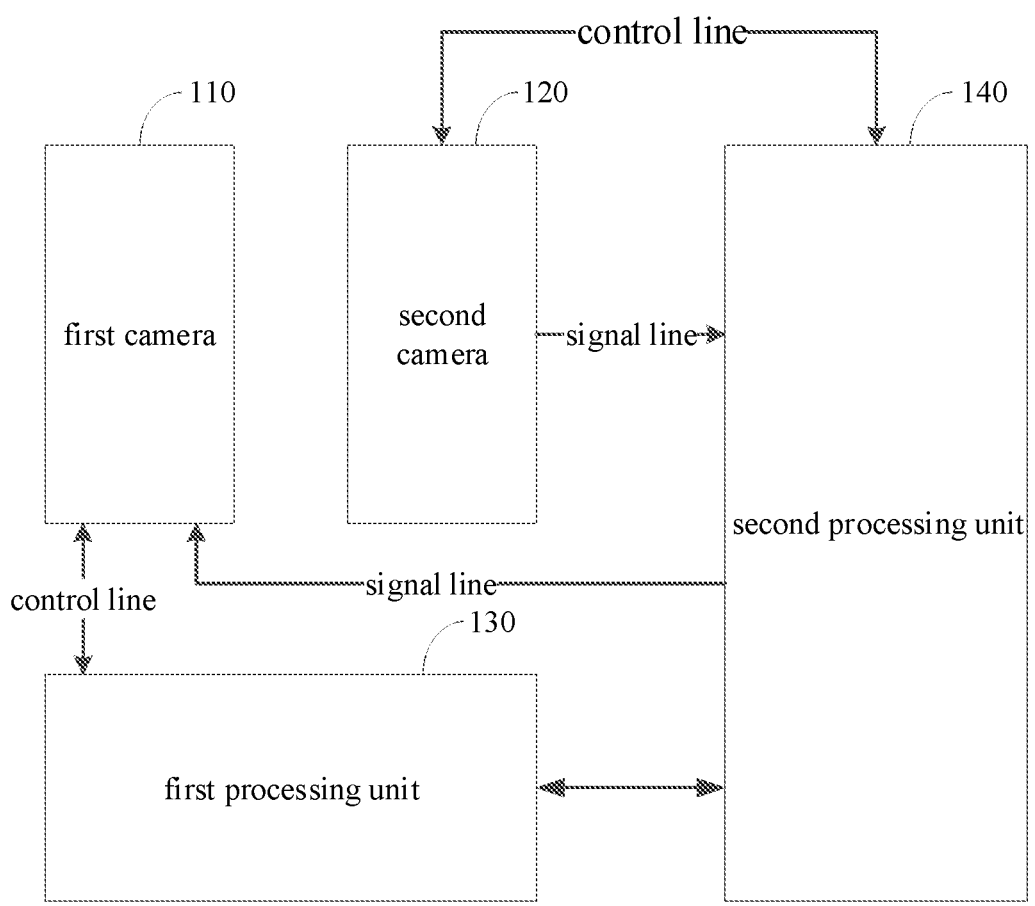
FIG. 1 is an application scenario illustrating a method for controlling image capturing in an embodiment.

FIG. 1 is an application scenario illustrating a method for controlling image capturing in an embodiment. As illustrated in FIG. 1, the application scenario may include a first camera 110, a second camera 120, a first processing unit 130 and a second processing unit 140. The first camera 110 may be a laser camera. The second camera 120 may be a red/green/blue (RGB) camera. The first processing unit 130 may be a microcontroller unit (MCU) module or the like. The second processing unit 140 may be a central processing unit (CPU) module or the like. The first processing unit 130 is coupled to the first camera 110 via a control line. The second processing unit 140 is coupled to the second camera 120 via a control line. The first processing unit 130 is coupled to the second processing unit 140. The second processing unit 130 is also coupled to the first camera 110 and the second camera 120 respectively via a signal line.

In response to receiving a data obtaining request, the second processing unit 140 may control the second camera 120 to collect a second image through the control line according to the data obtaining request, and send an image collection instruction to the first processing unit 130. In response to receiving the image collection instruction sent by the second processing unit 140, the first processing unit 130 may control the first camera 110 to collect a first image through the control line according to the image collection instruction. In response to collecting the second image, the second camera 120 may send a synchronization signal to the second processing unit 140 through the signal line at an exposure start time. The second processing unit 140 may obtain a first exposure time period of the first camera 110 and a second exposure time period of the second camera 120 in response to receiving the synchronization signal sent by the second camera 120, and calculate a delay time period according to the first exposure time period and the second exposure time period. The second processing unit 140 may forward the synchronization signal to the first camera 110 through the signal line in response to a time period of receiving the synchronization signal reaching the delay time period. The first camera 110 may start exposure and collect the first image in response to receiving the synchronization signal, and transmit the collected first image to the first processing unit 130. The first processing unit 130 may process the first image and send the processed first image to the second processing unit 140.

Figure 2:
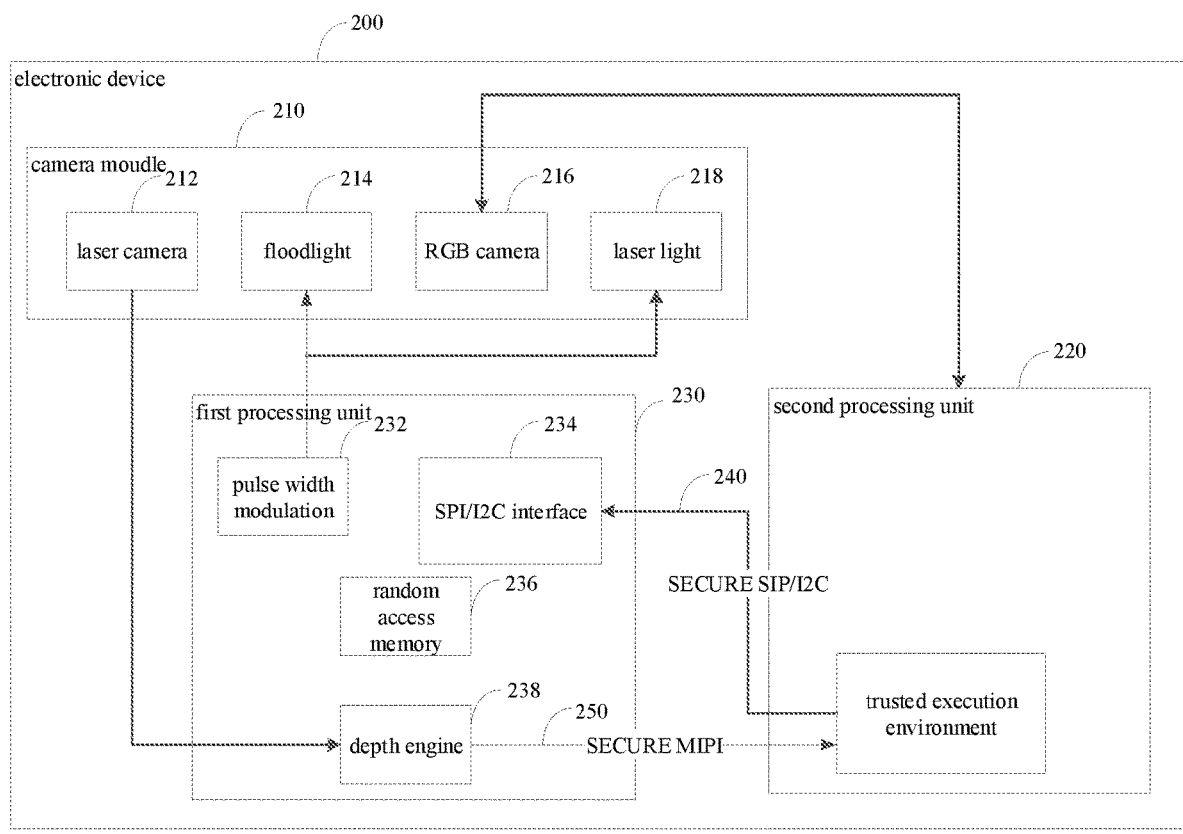
FIG. 2 is an application scenario illustrating a method for controlling image capturing in another embodiment.

FIG. 2 is an application scenario illustrating a method for controlling image capturing in another embodiment. As illustrated in FIG. 2, the electronic device 200 may include a camera module 210, a second processing unit 220, and a first processing unit 230. The second processing unit 220 may be a CPU module. The first processing unit 230 may be an MCU module or the like. The first processing unit 230 is coupled between the second processing unit 220 and the camera module 210. The first processing unit 230 may control a laser camera 212, a floodlight 214 and a laser light 218 in the camera module 210. The second processing unit 220 may control an RGB camera 216 in the camera module 210.

The camera module 210 includes the laser camera 212, the floodlight 214, the RGB camera 216 and the laser light 218. The laser camera 212 may be an infrared camera, and may be configured to obtain an infrared image. The floodlight 214 may be a surface light source that can emit infrared light. The laser light 218 may be a point light source with a pattern that can emit laser light. The laser camera 212 may obtain the infrared image according to reflected light when the floodlight 214 is the surface light source. The laser camera 212 may obtain a speckle image according to reflected light when the laser light 218 is the point light source. The speckle image is an image with a distorted pattern after a laser having a pattern and emitted by the laser light 218 is reflected.

The second processing unit 220 may be coupled to the RGB camera 216 and the laser camera 212 respectively through a signal line. The RGB camera 216 may send the synchronization signal to the second processing unit 220 in response to collecting each image. The second processing unit 220 may obtain an exposure time period of the laser camera 212 and an exposure time period of the RGB camera 216 after receiving the synchronization signal sent by the RGB camera 216, and calculate a delay time period according to the exposure time period of the laser camera 212 and the exposure time period of the RGB camera 216. The second processing unit 220 may forward the synchronization signal to the laser camera 212 through the signal line in response to a time period of receiving the synchronization signal reaching the delay time period. The laser camera 212 may receive the synchronization signal, start exposure and collect the infrared image, the speckle or the like according to the synchronization signal.

The second processing unit 220 may include a CPU kernel operating under a trusted execution environment (TEE) and a CPU kernel operating under a rich execution environment (REE). Both the TEE and the REE are operation modes of an advanced RISC machines (ARM) module. The REE has a higher security level. The second processing unit 220 only has one CPU kernel which may operate under the TEE at the same time. In general, an operation behavior with a high security level in the electronic device 200 needs to be executed in the CPU kernel under the TEE. An operation behavior with a low security level may be executed in the CPU kernel under the REE.

The first processing unit 230 includes a pulse width modulation (PWM) module 232, a serial peripheral interface/inter-integrated circuit (SPI/I2C) interface 234, a random access memory (RAM) module 236 and a depth engine 238. The PWM module 232 may emit pulses to the camera module, to control the floodlight 214 or the laser light 218 to be turned on, such that the laser camera 212 may collect the infrared image or the speckle image. The SPI/I2C interface 234 may be configured to receive the image collection instruction sent by the second processing unit 220. The depth engine 238 may process the speckle image to obtain a depth parallax map.

When the second processing unit 220 receives the data obtaining request of an application, for example, when the application needs to perform face unlocking or face payment, the image collection instruction may be sent to the first processing unit 230 through the CPU kernel operating under the TEE. When the first processing unit 230 receives the image collection instruction, the PWM module 232 may emit pulses to control the floodlight 214 and the laser light 218 in the camera module 210 to be turned on, such that the infrared image and the speckle image are collected by the laser camera 212. The camera module 210 may send the collected infrared image and the collected speckle image to the first processing unit 230. The first processing unit 230 may process the received infrared image to obtain an infrared parallax map and process the received speckle image to obtain a speckle parallax map or a depth parallax map. The first processing unit 230 processes the received infrared image and the received speckle image as follows. The first processing unit 230 performs correction on the received infrared image or the received speckle image, to remove influences caused by internal parameters and external parameters in the camera module 210 on the received images. The first processing unit 230 may be set to different modes, and different images are outputted in different modes. When the first processing unit 230 is set to a speckle image mode, the first processing unit 230 processes the speckle image to obtain the speckle parallax map, according to which, a target speckle image may be obtained. When the first processing unit 230 is set to a depth image mode, the first processing unit 230 processes the speckle image to obtain the depth parallax map, according to which, a depth image may be obtained. The depth image refers to an image with depth information. The first processing unit 230 may send the infrared parallax map and the speckle parallax map to the second processing unit 220. The first processing unit 230 may also send the infrared parallax map and the depth parallax map to the second processing unit 220. The second processing unit 220 may obtain the target infrared image according to the infrared parallax map and obtain the depth image according to the depth parallax map. Further, the second processing unit 220 may perform face recognition, face matching and living body detection, and obtain depth information of the detected face according to the target infrared image and the depth image.

The first processing unit 230 communicates with the second processing unit 220 through a fixed security interface, to ensure security for transmitting data. As illustrated in FIG. 1, the second processing unit 220 sends data to the first processing unit 230 through a SECURE SPI/I2C 240, and the first processing unit 230 sends data to the second processing unit 220 through a SECURE mobile industry processor interface (MIPI) 250.

In an embodiment, the first processing unit 230 may also obtain the target infrared image according to the infrared parallax map and calculate the depth image according to the depth parallax map, and then send the target infrared image and the depth image to the second processing unit 220.

Figure 3:
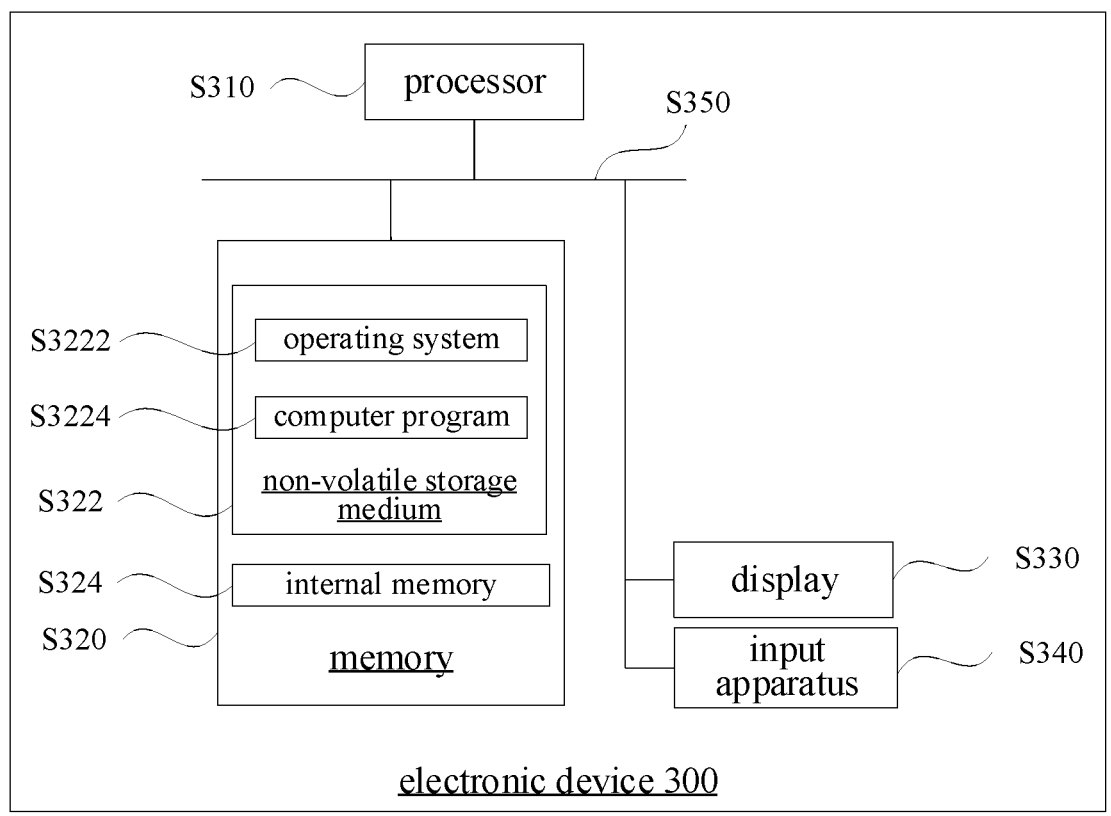
FIG. 3 is a block diagram illustrating an electronic device in an embodiment.

FIG. 3 is a block diagram illustrating an electronic device in an embodiment. As illustrated in FIG. 3, the electronic device 300 includes a processor 310, a memory 320, a display 330 and an input apparatus 340 coupled via a system bus 350. The memory 320 may include a non-volatile storage medium 322 and an internal memory 324. The non-volatile storage medium 322 of the electronic device 300 has an operating system 3222 and a computer program 3224 stored thereon. The computer program 3224 is configured to implement a method for controlling image capturing provided in embodiments of the present disclosure when executed by the processor 310. The processor 310 is configured to provide computing and controlling ability to support operation of the entire electronic device 300. The internal memory 324 in the electronic device 300 provides environment for executing the computer program 3224 in the non-volatile storage medium 322. The display 330 of the electronic device 300 may be a liquid crystal display, an electronic ink display or the like. The input apparatus 340 may be a touch layer on the display 330, a keypad, a trackball or a touchpad provided on the housing of the electronic device 300, or an external keyboard, a touchpad, a mouse or the like. The electronic device 300 may be a telephone, a tablet, a personal digital assistant, a wearable device or the like. It should be understood by those skilled in the art that, the structure illustrated in FIG. 3 is merely a block diagram of a part of the electronic device related to the technical solution of the present disclosure, which is not construed to limit the electronic device to which the technical solution of the present disclosure is applied. A detailed electronic device may include more or fewer components than those shown in FIG. 3, or some components may be combined, or components may be arranged in a different manner.

Figure 4:
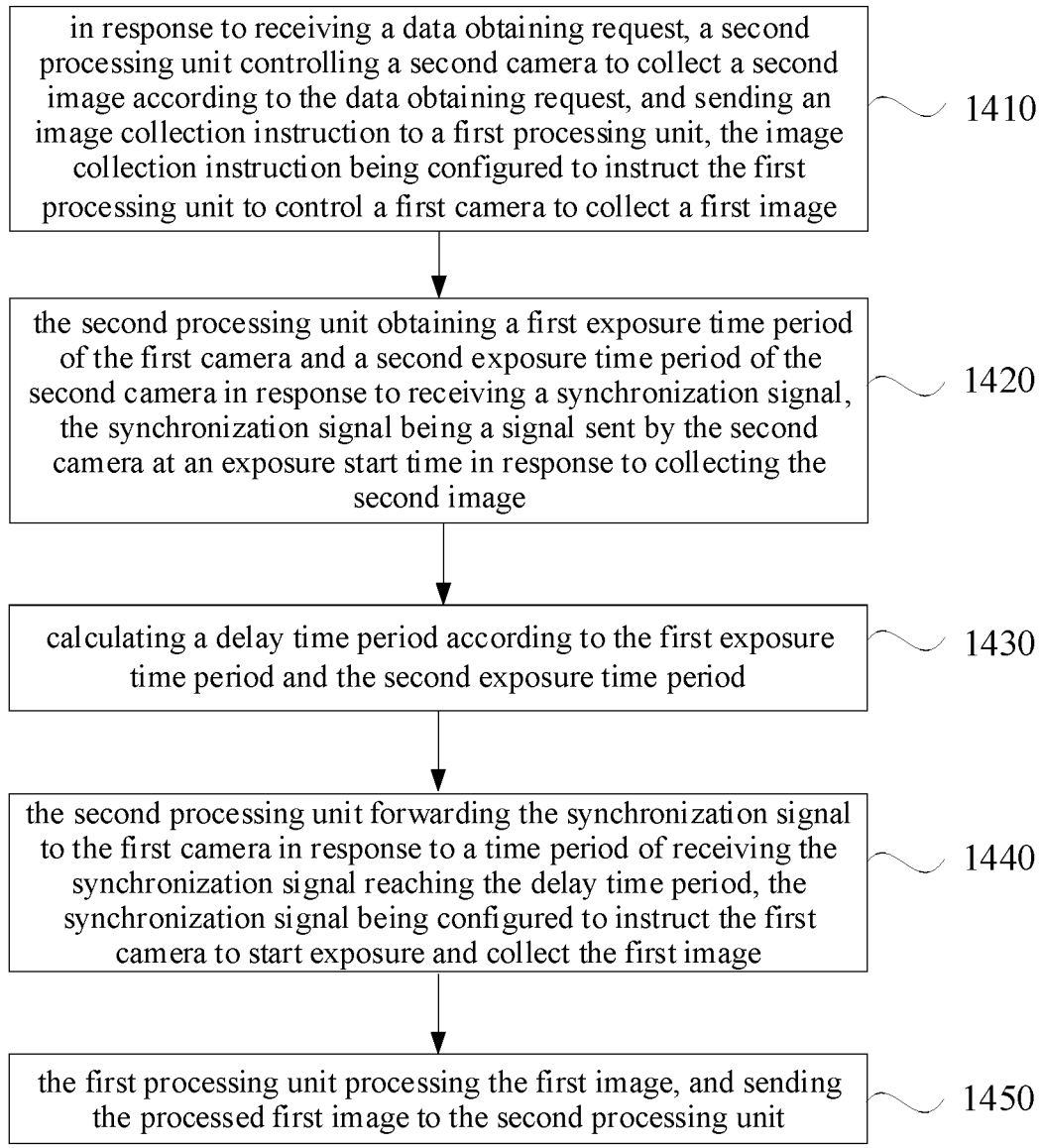
FIG. 4 is a flow chart illustrating a method for controlling image capturing in an embodiment.

As illustrated in FIG. 4, in an embodiment, a method for controlling image capturing is provided. The method includes following blocks.

At block 1410, the second processing unit controls a second camera to collect a second image according to a data obtaining request and sends an image collection instruction to a first processing unit in response to receiving the data obtaining request. The image collection instruction is configured to instruct the first processing unit to control a first camera to collect a first image.

The first camera may be controlled to be turned on and to collect the first image when an application in an electronic device needs to obtain face data. The face data may include, but is not limited to, data for face verification in a scenario such as face unlocking and face payment, face depth information and the like. The first camera may be a laser camera. The laser camera may collect invisible light images with different wavelengths. The first image may include, but is not limited to, an infrared image, a speckle image and the like. The speckle image refers to an infrared image having a speckle pattern.

When the application needs to obtain the face data, the application may send the data obtaining request to the second processing unit. The second processing unit may send the image collection instruction to the first processing unit after receiving the data obtaining request. The first processing unit may be an MCU module. The second processing unit may be a CPU module. Alternatively, the second processing unit may first detect whether the data obtaining request includes a visible light image obtaining instruction. When the data obtaining request includes the visible light image obtaining instruction, it indicates that the application needs to obtain a visible light image including a face while obtaining the face data. When the data obtaining request includes the visible light image obtaining instruction, the second processing unit may control the second camera to collect the second image according to the visible light image obtaining instruction. The second camera may be an RGB camera. The second image may be an RGB image including the face.

The first processing unit may control the first camera to collect the first image according to the image collection instruction after receiving the image collection instruction. The first image may include an infrared image, a speckle image and the like. The first processing unit may control to turn on a floodlight in a camera module and collect the infrared image through the laser camera. The first processing unit may control to turn on a laser such as a laser light in the camera module and collect the speckle image through the laser camera. The floodlight may be a point light source irradiating uniformly in all directions. Light rays emitted by the floodlight may be infrared light. The laser camera may capture the face to obtain the infrared image. Diffraction may be performed on laser lights emitted by the laser through a lens and a diffractive optical element (DOE) to generate a pattern having speckle particles. The pattern having speckle particles is projected to a target object. Shift of the speckle pattern may be generated since distances between respective points of the target object and the electronic device are different. The laser camera captures the target object to obtain the speckle image.

At block 1420, the second processing unit obtains a first exposure time period of the first camera and a second exposure time period of the second camera are obtained in response to receiving a synchronization signal sent by the second camera. The synchronization signal is a signal sent by the second camera at an exposure start time when the second camera starts collects the second image.

The first processing unit may be coupled to the first camera through a control line, and control the first camera to collect the first image through the control line. The second processing unit may be coupled to the second camera through a control line, and control the second camera to collect the second image through the control line. The first processing unit may be coupled to the second processing unit. The second processing unit may also be coupled to the first camera and the second camera respectively through a signal line. The signal line may be a synchronization signal line.

In response to collecting each image, the second camera may send the synchronization signal to the second processing unit connecting the signal line at the exposure start time. The synchronization signal may be a start of frame (SOF), and may be configured to each image for starting exposure. The second processing unit may obtain the first exposure time period of the first camera and the second exposure time period of the second camera in response to receiving the synchronization signal sent by the second camera. The exposure time period may refer to a photosensitive time period. The longer the exposure time period is, the more light is incident. Usually, the first exposure time period of the first camera is quite different from the second exposure time period of the second camera. The first exposure time period of the first camera may be lower than the second exposure time period of the second camera. However, it is not limited thereto, and there may be a case where the first exposure time period of the first camera is greater than the second exposure time period of the second camera.

At block 1430, a delay time period is calculated according to the first exposure time period and the second exposure time period.

The second processing unit may calculate the delay time period according to the first exposure time period of the first camera and the second exposure time period of the second camera. The delay time period may refer to a time span for which exposure start of the first camera is delayed. By delaying the time point at which the first camera starts exposure, it may ensure that the first camera is synchronized with the second camera.

In an embodiment, the electronic device may preset a time point at which the first camera is synchronized with the second camera during an exposure process. The synchronous time point during the exposure process may refer to that, a ratio of a time period that has elapsed since the first camera starts exposure to the first exposure time period is equal to a ratio of a time period that has elapsed since the second camera starts exposure to the second exposure time period. For example, it may be set that the first camera and the second camera end the exposure simultaneously, or the first camera at half of the first exposure time period is consistent with the second camera at half of the second exposure time period, or the first camera at ¾ of the first exposure time period is consistent with the second camera at ¾ of the second exposure time period. The second processing unit may calculate the delay time period according to the first exposure time period, the second time period and the synchronous time point during the exposure process.

At block 1440, the second processing unit forwards the synchronization signal to the first camera in response to a time period of receiving the synchronization signal reaching the delay time period. The synchronization signal is configured to instruct the first camera to start exposure and collect the first image.

After calculating the delay time period, the second processing unit may forward the synchronization signal to the first camera in response to the time period of receiving the synchronization system reaching the delay time period. The first camera starts exposure after receiving the synchronization signal, such that the first camera and the second camera are synchronized at the same time during the exposure procedure. For example, the electronic device may preset that the first camera and the second camera keep consistent at half of the second exposure period, then the second processing unit calculates the delay time period, and forwards the synchronization signal to the first camera in response to the time period of receiving the synchronization signal reaching the delay time period, such that the second camera is half exposed while the first camera is half exposed, and the first camera and the second camera keep consistent.

At block 1450, the first image is processed by the first processing unit, and the processed first image is sent to the second processing unit.

The first camera may send the collected first image to the first processing unit. The first processing unit may process the first image. The first processing unit may be set in different modes. The first processing unit in different modes may collect different first images, and perform different processes on the first image. When the first processing unit is in an infrared mode, the first processing unit may control to turn on the floodlight, collect an infrared image through the first camera, and process the infrared image to obtain an infrared parallax map. When the first processing unit is in a speckle image mode, the first processing unit may control to turn on the laser light, collect a speckle image through the first camera, and process the speckle image to obtain a speckle parallax map. When the first processing unit is in a depth image mode, the first processing unit may process the speckle image to obtain a depth parallax map.

In an embodiment, the first processing unit may perform correction on the first image. Performing the correction refers to correct image content offset of the first image caused by internal parameters and external parameters of the first camera and the second camera, such as image content offset caused by a deflection angle of the laser camera, and position layout between the laser camera and the RGB camera. A parallax map of the first image may be obtained after performing the correction on the first image. For example, the correction may be performed on the infrared image to obtain the infrared parallax map, and the correction may be performed on the speckle image to obtain the speckle parallax map or the depth parallax map. Performing the correction on the first image may avoid a condition that an image finally presented on the display of the electronic device appears ghosting.

The first processing unit may process the first image, and then send the processed first image to the second processing unit. The second processing unit may obtain a target image according to the processed first image, such as a target infrared image, a target speckle image, a target depth image and the like. The second processing unit may process the target image according to requirement of the application.

For example, when the application needs to perform face verification, the second processing unit may perform face detection according to the target image and the like. The face detection may include face recognition, face matching and living body detection. The face recognition refers to recognize whether there is a face in the target image. The face matching refers to match the face in the target image with a preset face. The living body detection refers to detect whether the face in the target image is biologically active. When the application needs to obtain depth information of the face, the generated target depth image may be uploaded to the application. The application may perform image optimization process, three-dimensional modeling and the like according to the received target depth image.

In this embodiment, the second processing unit may calculate the delay time period according to the exposure time periods of the two cameras in response to receiving the synchronization signal sent by the second camera. The second processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. The second processing unit dynamically adjusts the time point at which the first camera is synchronized with the second camera, such that synchronization effect is better, and it may also ensure that image content collected by the two cameras is consistent when the exposure time periods of the two cameras have a greater difference.

In an embodiment, calculating the delay time period according to the first exposure time period and the second exposure time period at block 1430 includes: calculating an exposure time difference between the first exposure time period and the second exposure time period, and dividing the exposure time difference by 2 to obtain the delay time period.

The electronic device may set that the first camera is consistent with the second camera at half of the exposure. The second camera is also half exposed while the first camera is half exposed. In response to receiving the synchronization signal sent by the second camera, the second processing unit may calculate the exposure time difference between the first exposure time period and the second exposure time period, and divide the exposure time difference by 2 to obtain the delay time period. The delay time period is $T_3=|T_1-T_2|/2$. $T_1$ represents the first exposure time period, and $T_2$ represents the second exposure time period. For example, when the first exposure time period of the first camera is 3 ms and the second exposure time period of the second camera is 30 ms, the exposure time difference between the first exposure time period and the second exposure time period may be calculated as 27 ms, and the exposure time difference may be divided by 2, to obtain the delay time period which is 13.5 ms.

Alternatively, the second processing unit may compare the exposure time difference with a time threshold after calculating the exposure time difference between the first exposure time period and the second exposure time period, and determine whether the exposure time difference is greater than the time threshold. When the exposure time difference is greater than the time threshold, the second processing unit may divide the exposure time difference by 2 to obtain the delay time period, and the second processing unit forwards the synchronization signal to the first camera in response to the time period after the second processing unit receives the synchronization signal reaching the delay time period. When the exposure time difference is lower than or equal to the time threshold, the second processing unit may forward the synchronization signal to the first camera directly, and not delay the time point at which the first camera starts exposure. The time threshold may be set according to an actual requirement, such as 1 ms, 2 ms and the like, thus ensuring the image content collected by the first camera and the second camera is within a tolerable error range, and reducing computing burden of the second processing unit.

In an embodiment, in order to ensure that the second camera is also half exposed when the first camera is half exposed, the second processing unit may also calculate a first intermediate exposure time point of the first exposure time period and a second intermediate exposure time point of the second exposure time period. The intermediate exposure time point refers to a time point at the half of the exposure process. The second processing unit may determine a difference value between the first intermediate exposure time point and the second intermediate exposure time point as the delay time period. The delay time period is $T_3=|T_1/2-T_2/2|$. $T_1$ represents the first exposure time period, and $T_2$ represents the second exposure time period. For example, when the first exposure time period of the first camera is 3 ms and the second exposure time period of the second camera is 30 ms, the first intermediate exposure time point of the first exposure time period may be calculated to be 1.5 ms, the second intermediate exposure time point of the second exposure time period may be calculated to be 15 ms, the difference value between the first intermediate exposure time point and the second intermediate exposure time point may be calculated to be 13.5 ms, and the difference value 13.5 ms may be determined as the delay time period. It should be understood that, other algorithms may also be employed to ensure the synchronization between the first camera and the second camera, which is not limited.

In this embodiment, the time point at which the synchronization signal is forwarded may be adjusted dynamically according to the exposure time periods of the first camera and the second camera, such that the time point at which the first camera is synchronized with the second camera may be adjusted dynamically, which ensures that the first camera is consistent with the second camera at half of the exposure, and the synchronization effect is better.

Figure 5:
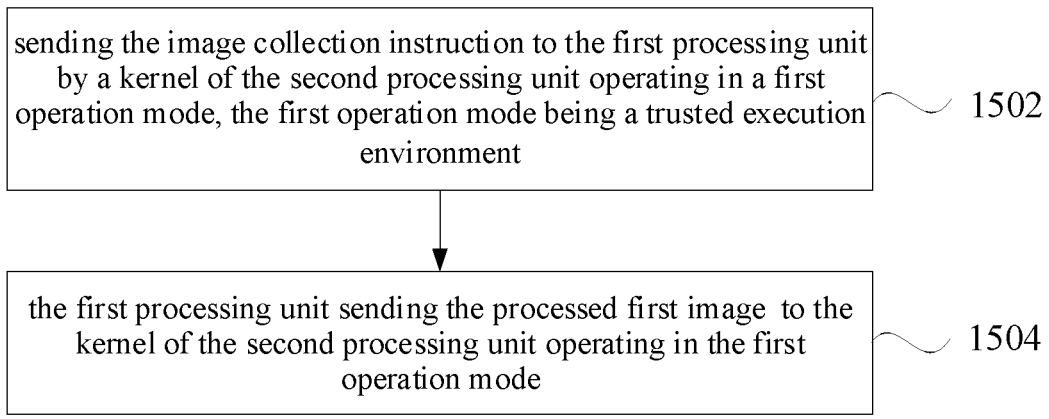
FIG. 5 is a flow chart illustrating a second processing unit sending an image collection instruction to a first processing unit in an embodiment.

As illustrated in FIG. 5, in an embodiment, sending the processed first image to the second processing unit includes acts in following blocks.

At block 1502, the image collection instruction is sent to the first processing unit through a kernel of the second processing unit operating in a first operation mode. The first operation mode is a trusted execution environment.

In an embodiment, the second processing unit in the electronic device may include two operation modes. The first operation mode may be a TEE. The TEE is the trusted execution environment, of which the security level is high. The second operation mode may be a REE. The REE is a rich execution environment, of which the security level is low. The second processing unit may send the image collection instruction to the first collection unit in the first operation mode in response to receiving a data obtaining request sent by the application. When the second processing unit is a CPU with one core, the core may be directly switched from the second operation mode to the first operation mode. When the second processing unit has multiple kernels, one kernel may be switched from the second operation mode to the first operation mode, and other kernels still operate in the second operation mode. The image collection instruction is sent to the first processing unit through the kernel operating in the first operation mode.

At block 1504, the first processing unit sends the processed first image to the kernel of the second processing unit operating in the first operation mode.

The first processing unit may send the processed first image to the kernel operating in the first operation mode after processing the collected first process image, which may ensure that the first processing unit always operate in the trusted execution environment and improve the security. The second processing unit may obtain the target image according to the processed first image in the kernel operating in the first operation mode, and process the target image according to the requirement of the application in the kernel operating in the first operation mode. For example, the second processing unit may perform face detection on the target image in the kernel operating in the first operation mode.

In an embodiment, since there is only one kernel operating in the first operation mode, when the second processing unit performs the face detection on the target image in the TEE, a serial mode may be employed to perform face recognition, face matching, living body detection and the like sequentially on the target image. The second processing unit may perform the face recognition on the target image firstly. When a face is recognized, the second processing unit matches the face included in the target image with a pre-stored face, to determine whether the two faces are identical. When the two faces are identical, the second processing unit performs the living body detection on the face according to the target image, to prevent that the collected face is a plane face. When the face is not recognized, the face matching and the living body detection are not performed, which may reduce the process burden of the second processing unit.

In this embodiment, the image collection instruction is sent to the first processing unit through the kernel with a high security in the second processing unit, which may ensure that the first processing unit is in the environment with a high security, and improve security of data.

Figure 6:
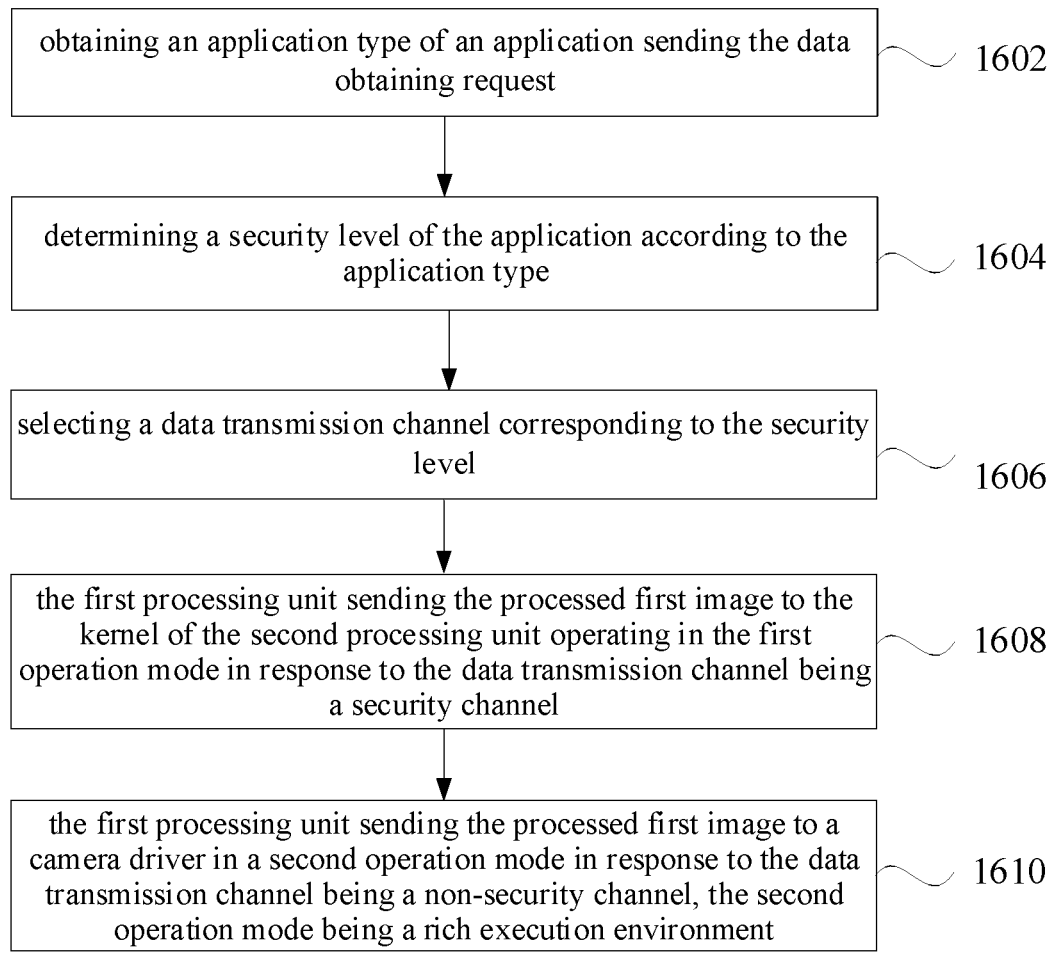
FIG. 6 is a flow chart illustrating a first processing unit sending a processed first image to a second processing unit in an embodiment.

As illustrated in FIG. 6, in an embodiment, the above method for controlling image capturing also includes acts in following blocks.

At block 1602, an application type of the application sending the data obtaining request is obtained.

At block 1604, a security level of the application is determined according to the application type.

When the application of the electronic device sends the data obtaining request to the second processing unit, the second processing unit may obtain the application type of the application, and obtain the security level corresponding to the application type. The application type may include, but is not limited to, an unlocking application, a payment application, a camera application, an image optimization application and the like. Different application types have different security levels. For example, security levels corresponding to the payment application and the unlocking application may be high, and security levels corresponding to the camera application and the image optimization application may be low, which is not limited.

At block 1606, a data transmission channel corresponding to the security level is selected.

The second processing unit may select the data transmission channel corresponding to the security level of the application. The data transmission channel may include, but is not limited to, a security channel and a non-security channel. The security channel may correspond to the application with the high security level. The non-security channel may correspond to the application with the low security level. For example, the payment application may correspond to the security channel, and the image optimization application may correspond to a common channel. In the security channel, the transmitted data may be encrypted, avoiding data leakage or theft.

At block 1608, the first processing unit sends the processed first image to the kernel of the second processing unit operating in the first operation mode when the data transmission channel is the security channel.

The first processing unit may send the processed first image to the kernel of the second processing unit operating in the first operation mode when the data transmission channel is the security channel. The second processing unit may obtain the target image in the kernel operating in the first operation mode according to the processed first image. The target image includes the target infrared image, the target speckle image, the target depth image or the like. The second processing unit may perform face detection on the target image in the kernel operating in the first operation mode, and perform face recognition, face matching, living body detection and the like sequentially in a serial mode. The second processing unit may transmit data required by the application to the application through the security channel according to the requirement of the application. For example, when the application needs to perform the face detection, the second processing unit may transmit a result of the face detection to the application through the security channel. When the application needs to obtain depth information of the face, the second processing unit may transmit the target depth image to the application through the security channel.

At block 1610, the first processing unit sends the processed first image to a camera driver in a second operation mode in response to the data transmission channel being a non-security channel. The second operation mode is a rich execution environment.

The first processing unit may send the processed first image to the camera driver in the second operation mode when the data transmission channel is the non-security channel. The camera driver may operate on a kernel of the second processing unit operating in the second operation mode. The second processing unit may perform the face detection on the target image through the camera driver. The target image may be obtained according to the processed first image. The second processing unit may perform the face detection on the target image in parallel in the REE, and may perform the face recognition, the face matching, the living body detection and the like on the target image in the multiple kernels in the second operation mode respectively, which may improve efficiency for processing the data. The camera driver may transmit the data required by the application to the application according to the requirement of the application In an embodiment, the second processing unit may obtain the security level of the application sending the data obtaining request, and determine an image accuracy corresponding to the security level. The higher the image accuracy is, the clearer the corresponding image is, and the more information the image includes. The second processing unit may send image data corresponding to the image accuracy to the application. For example, when the second processing unit sends the target depth image to the application, the application with a high security level may correspond to the target depth image with a high image accuracy, and the application with a low security level may correspond to the target depth image with a low image accuracy. Alternatively, the second processing unit may adjust the image accuracy of the image data by adjusting image resolution. The higher the image resolution is, the higher the image accuracy is. The lower the image resolution is, the lower the image accuracy is. The image accuracy of the image data may also be adjusted by controlling the number of diffraction points of the laser light. The higher the image accuracy is, the more diffraction points are, and the lower the image accuracy is, the less the diffraction points are. It should be understood that, other ways may be employed to control the image accuracy, which is not limited. The image accuracy is adjusted according to the security level of the application, improving the security of the image data.

In this embodiment, the corresponding data transmission channel is selected to transmit the data according to the security level of the application, improving the security for transmitting the data in the security channel and improving the efficiency for processing the data in the non-security channel.

In an embodiment, a method for controlling image capturing is provided. The method includes following steps.

At step (1), in response to receiving a data obtaining request, the second processing unit controls a second camera to collect a second image according to the data obtaining request, and sends an image collection instruction to a first processing unit. The image collection instruction is configured to instruct the first processing unit to control a first camera to collect a first image.

In an embodiment, the first processing unit is coupled to the first camera through a control line, the second processing unit is coupled to the second camera through a control line, the first processing unit is coupled to the second processing unit, and the second processing unit is coupled to the first camera and the second camera respectively through a signal line.

At step (2), the second processing unit obtains a first exposure time period of the first camera and a second exposure time period of the second camera in response to receiving a synchronization signal sent by the second camera. The synchronization signal is a signal sent by the second camera at an exposure start time in response to collecting the second image.

At step (3), a delay time period is calculated according to the first exposure time period and the second exposure time period.

In an embodiment, step (3) includes: calculating an exposure time difference between the first exposure time period and the second exposure time period, and dividing the exposure time difference by 2 to obtain the delay time period.

In an embodiment, step (3) includes: calculating a first intermediate exposure time point of the first exposure time period and a second intermediate exposure time point of the second exposure time period; and determining a difference value between the first intermediate exposure time point and the second intermediate exposure time point as the delay time period.

At step (4), the scone processing unit forwards the synchronization signal to the first camera in response to a time period of receiving the synchronization signal reaching the delay time period. The synchronization signal is configured to instruct the first camera to start exposure and to collect the first image.

At step (5), the first image is processed by the first processing unit, and the processed first image is sent to the second processing unit.

In an embodiment, step (1) includes: sending the image collection instruction to the first processing unit through a kernel of the second processing unit operating in a first operation mode, the first operation mode being a trusted execution environment; step (5) includes: the first processing unit sending the processed first image to the kernel of the second processing unit operating in the first operation mode.

In an embodiment, step (5) includes: obtaining an application type of an application sending the data obtaining request; determining a security level of the application according to the application type; selecting a data transmission channel corresponding to the security level; the first processing unit sending the processed first image to the kernel of the second processing unit operating in the first operation mode in response to the data transmission channel being a security channel; and the first processing unit sending the processed first image to a camera driver in a second operation mode in response to the data transmission channel being a non-security channel, the second operation mode being a rich execution environment.

In an embodiment, the above method for controlling image capturing further includes: obtaining a security level of an application sending the data obtaining request; determining an image accuracy corresponding to the security level; and sending image data corresponding to the image accuracy to the application.

In this embodiment, the second processing unit calculates the delay time period according to the exposure time periods of the two cameras in response to receiving the synchronization signal sent by the second camera. The second processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. The second processing unit dynamically adjusts the time point at which the first camera is synchronized with the second camera, such that the synchronization effect is better, and it may ensure that the image content collected by the two cameras is consistent when there is large difference between the exposure time periods of the two cameras.

It should be understood that, although respective steps in respective flow charts are sequentially displayed as indicated by the arrows, these steps are not necessarily performed in the order indicated by the arrows. Unless expressly stated in the present disclosure, there is no strict ordering for the execution of these steps, and these steps may be performed in other orders. Moreover, at least parts of the steps in the various flow charts above may include multiple sub-steps or multiple stages. Such sub-steps or stages are not necessarily performed at the same time, but may be executed at different times. These sub-steps or stages are not necessarily performed sequentially, but may be performed in turn or alternately with at least a portion of other steps or sub-steps or stages of other steps.

In an embodiment, an electronic device is provided. The electronic device includes a first processing unit, a second processing unit and a camera module. The first processing unit is coupled to the second processing unit and the camera module respectively. The camera module includes a first camera and a second camera. The first processing unit is coupled to the first camera through a control line. The second processing unit is coupled to the second camera through a control line. The first processing unit is coupled to the second processing unit. The second processing unit is further coupled to the first camera and the second camera respectively through a signal line.

The second processing unit is configured to, in response to receiving a data obtaining request, control the second camera to collect a second image according to the data obtaining request, and send an image collection instruction to the first processing unit.

The first processing unit is configured to control the first camera to collect a first image according to the image collection instruction.

The second camera is configured to send a synchronization signal to the second processing unit at an exposure start time in response to receiving the second image.

The second processing unit is further configured to obtain a first exposure time period of the first camera and a second exposure time period of the second camera in response to receiving the synchronization signal sent by the second camera, and to calculate a delay time period according to the first exposure time period and the second exposure time period.

The second processing unit is further configured to forward the synchronization signal to the first camera in response to a time period of receiving the synchronization signal reaching the delay time period.

The first camera is configured to start exposure and to collect the first image according to the synchronization signal.

The first processing unit is further configured to process the first image and to send the processed first image to the second processing unit.

In this embodiment, the second processing unit may calculate the delay time period according to the exposure time periods of the two cameras when receiving the synchronization signal sent by the second camera. The second processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. The second processing unit dynamically adjusts the time point at which the first camera is synchronized with the second camera, such that the synchronization effect is better, and it may ensure that the image content collected by the two cameras is consistent when there is large difference between the exposure time periods of the two cameras.

In an embodiment, the second processing unit is further configured to calculate an exposure time difference between the first exposure time period and the second exposure time period, and to divide the exposure time difference value by 2 to obtain the delay time period.

In an embodiment, the second processing unit is further configured to calculate a first intermediate exposure time point of the first exposure time period and a second intermediate exposure time point of the second exposure time period, and to determine a difference value between the first intermediate exposure time point and the second intermediate exposure time point as the delay time period.

In this embodiment, the time point at which the synchronization signal is forwarded may be adjusted dynamically according to the exposure time periods of the first camera and the second camera, such that the time point at which the first camera is synchronized with the second camera may be adjusted dynamically, ensuring that the first camera and the second camera keep consistent at the half of the exposure process, and making the synchronization effect better.

In an embodiment, the second processing unit is further configured to send the image collection instruction to the first processing unit by a kernel of the second processing unit operating in a first operation mode. The first operation mode is a trusted execution environment.

The first processing unit is further configured to send the processed first image to the kernel of the second processing unit operating in the first operation mode.

In this embodiment, the image collection instruction is sent to the first processing unit through the kernel with a high security in the second processing unit, which may ensure that the first processing unit is in an environment with a high security, and improve security of data.

In an embodiment, the second processing unit is further configured to obtain an application type of an application sending the data obtaining request, to determine a security level of the application according to the application type, and to select a data transmission channel corresponding to the security level.

The first processing unit is further configured to send the processed first image to the kernel of the second processing unit operating in the first operation mode in response to the data transmission channel being a security channel.

The first processing unit is further configured to send the processed first image to a camera driver in a second operation mode in response to the data transmission channel being a non-security channel. The second operation mode is a rich execution environment.

In an embodiment, the second processing unit is further configured to obtain a security level of the application sending the data obtaining request, to determine an image accuracy corresponding to the security level, and to send image data corresponding to the image accuracy to the application.

In this embodiment, the corresponding data transmission channel is selected to transmit the data according to the security level of the application, improving the security for transmitting the data in the security channel and improving the efficiency for processing the data in the non-security channel.

Figure 7:
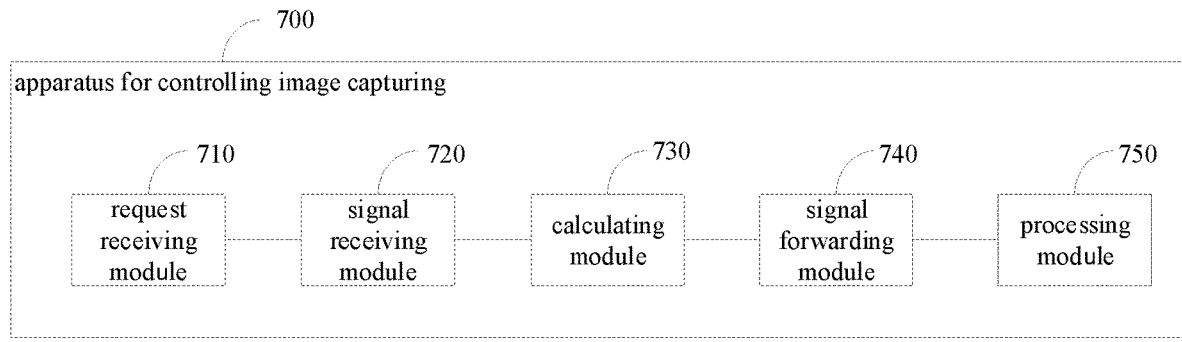
FIG. 7 is a block diagram illustrating an apparatus for controlling image capturing in an embodiment.

As illustrated in FIG. 7, in an embodiment, an apparatus 700 for controlling image capturing is provided. The apparatus includes a request receiving module 710, a signal receiving module 720, a calculating module 730, a signal forwarding module 740 and a processing module 750.

The request receiving module 710 is configured to, in response to a second processing unit receiving a data obtaining request, control a second camera to collect a second image according to the data obtaining request, and send an image collection instruction to a first processing unit. The image collection instruction is configured to instruct the first processing unit to control a first camera to collect a first image.

In an embodiment, the first processing unit is coupled to the first camera through a control line. The second processing unit is coupled to the second camera through a control line. The first processing unit is coupled to the second processing unit. The second processing unit is further coupled to the first camera and the second camera respectively through a signal line.

The signal receiving module 720 is configured to obtain a first exposure time period of the first camera and a second exposure time period of the second camera in response to the second processing unit receiving a synchronization signal. The synchronization signal is a signal sent by the second camera at an exposure start time in response to collecting the second image. The calculating module 730 is configured to calculate a delay time period according to the first exposure time period and the second exposure time period. The signal forwarding module 740 is configured to forward the synchronization signal to the first camera in response to a time period after the second processing unit receives the synchronization signal reaching the delay time period. The synchronization signal is configured to instruct the first camera to start exposure and to collect the first image. The processing module 750 is configured to process the first image by the first processing unit, and to send the processed first image to the second processing unit.

In this embodiment, the second processing unit may calculate the delay time period according to the exposure time periods of the two cameras in response to receiving the synchronization signal sent by the second camera. The second processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. The second processing unit dynamically adjusts the time point at which the first camera is synchronized with the second camera, such that synchronization effect is better, and it may also ensure that image content collected by the two cameras is consistent when the exposure time periods of the two cameras have a greater difference.

In an embodiment, the calculating module 730 is further configured to calculate an exposure time difference between the first exposure time period and the second exposure time period, and to divide the exposure time difference value by 2 to obtain the delay time period.

In an embodiment, the calculating module 730 is further configured to calculate a first intermediate exposure time point of the first exposure time period and a second intermediate exposure time point of the second exposure time period, and to determine a difference value between the first intermediate exposure time point and the second intermediate exposure time point as the delay time period.

In this embodiment, a time point at which the synchronization signal is forwarded may be adjusted dynamically according to the exposure time periods of the first camera and the second camera, such that the time point at which the first camera is synchronized with the second camera may be adjusted dynamically, ensuring that the first camera and the second camera keep consistent with each other at half of the exposure process, and making the synchronization effect better.

In an embodiment, the request receiving module 710 is further configured to send the image collection instruction to the first processing unit by a kernel of the second processing unit operating in a first operation mode. The first operation mode is a trusted execution environment.

The processing module 750 is further configured to send the processed first image to the kernel of the second processing unit operating in the first operation mode.

In this embodiment, the image collection instruction is sent to the first processing unit through the kernel with a high security in the second processing unit, which may ensure that the first processing unit is in an environment with a high security, and improve security of data.

Figure 8:
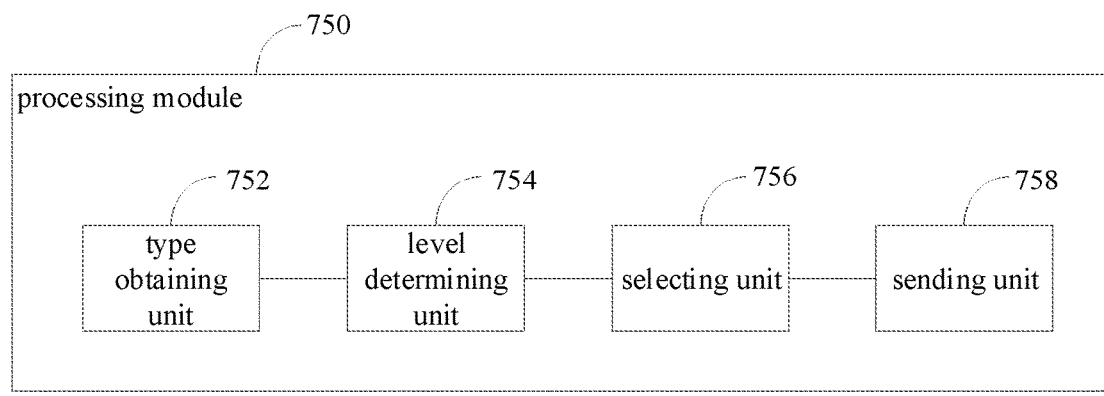
FIG. 8 is a block diagram illustrating a processing module in an embodiment.

As illustrated in FIG. 8, in an embodiment, the processing module 750 includes a type obtaining unit 752, a level determining unit 754, a selecting unit 756 and a sending unit 758.

The type obtaining unit 752 is configured to obtain an application type of an application sending the data obtaining request. The level determining unit 754 is configured to determine a security level of the application according to the application type. The selecting unit 756 is configured to select a data transmission channel corresponding to the security level. The sending unit 758 is configured to send the processed first image to the kernel of the second processing unit operating in the first operation mode in response to the data transmission channel being a security channel. The sending unit 758 is further configured to send the processed first image to a camera driver in a second operation mode in response to the data transmission channel being a non-security channel. The second operation mode is a rich execution environment.

In an embodiment, the level determining unit 754 is further configured to obtain a security level of an application sending the data obtaining request and to determine an image accuracy corresponding to the security level.

The sending unit 758 is further configured to send image data corresponding to the image accuracy to the application.

In this embodiment, the corresponding data transmission channel is selected to transmit the data according to the security level of the application, improving the security for transmitting the data in the security channel and improving the efficiency for processing the data in the non-security channel.

Second Implementation

Figure 9:
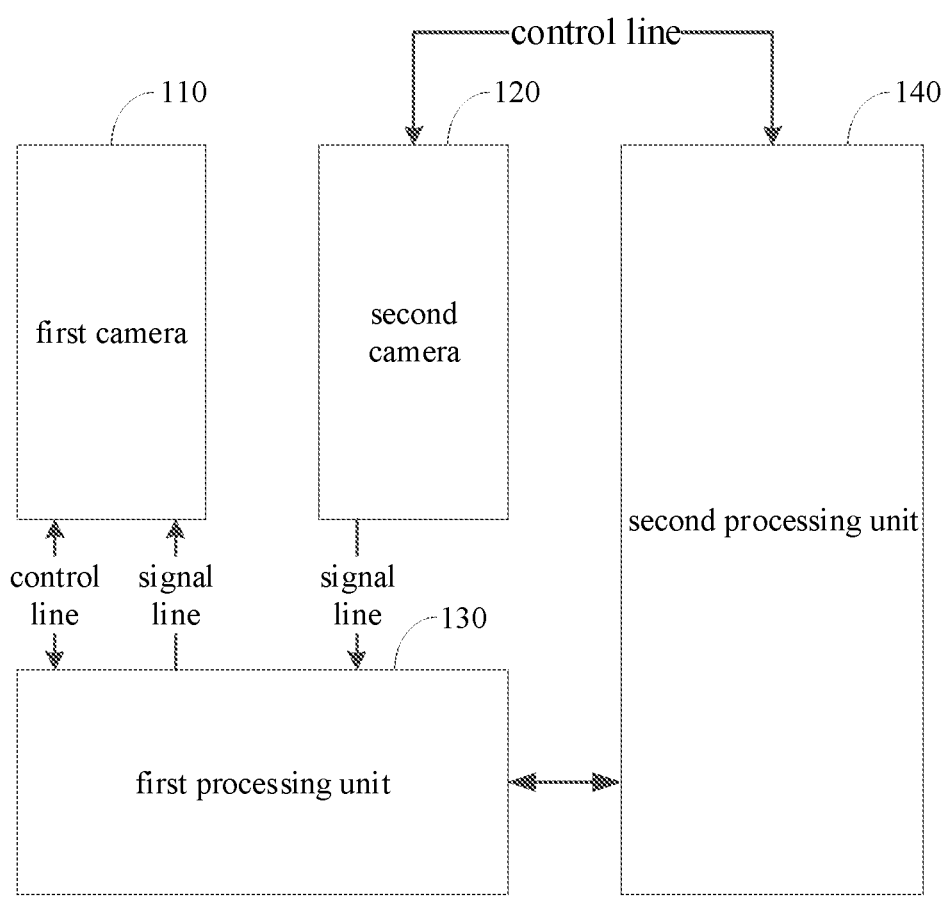
FIG. 9 is an application scenario illustrating a method for controlling image capturing in an embodiment.

FIG. 9 is an application scenario illustrating a method for controlling image capturing in an embodiment. As illustrated in FIG. 9, the application scenario may include a first camera 110, a second camera 120, a first processing unit 130 and a second processing unit 140. The first camera 110 may be a laser camera. The second camera 120 may be a red/green/blue (RGB) camera. The first processing unit 130 may be a microcontroller unit (MCU) module or the like. The second processing unit 140 may be a central processing unit (CPU) module or the like. The first processing unit 130 is coupled to the first camera 110 through a control line. The second processing unit 140 is coupled to the second camera 120 through a control line. The first processing unit 130 is coupled to the second processing unit 140. The first processing unit 130 is also coupled to the first camera 110 and the second camera 120 respectively through a signal line.

In response to receiving a data obtaining request, the second processing unit 140 may control the second camera 120 to collect a second image through the control line according to the data obtaining request, and send an image collection instruction to the first processing unit 130. The first processing unit 130 may control the first camera 110 to collect a first image through the control line according to the image collection instruction in response to receiving the image collection instruction sent by the second processing unit 140. The second camera 120 may send a synchronization signal to the first processing unit 130 through the signal line at an exposure start time in response to collecting each frame of the second image. The first processing unit 130 may obtain a first exposure time period of the first camera 110 and a second exposure time period of the second camera 120 in response to receiving the synchronization signal sent by the second camera 120, and calculate a delay time period according to the first exposure time period and the second exposure time period. The first processing unit 130 may forward the synchronization signal to the first camera 110 through the signal line in response to a time period of receiving the synchronization signal reaching the delay time period. The first camera 110 may start exposure and collect the first image in response to receiving the synchronization signal, and transmit the collected first image to the first processing unit 130. The first processing unit 130 may process the first image and send the processed first image to the second processing unit 140.

FIG. 2 is an application scenario illustrating a method for controlling image capturing in another embodiment. As illustrated in FIG. 2, the electronic device 200 may include a camera module 210, a second processing unit 220, and a first processing unit 230. The second processing unit 220 may be a CPU module. The first processing unit 230 may be an MCU module or the like. The first processing unit 230 is coupled between the second processing unit 220 and the camera module 210. The first processing unit 230 may control a laser camera 212, a floodlight 214 and a laser light 218 in the camera module 210. The second processing unit 220 may control an RGB camera 216 in the camera module 210.

The camera module 210 includes the laser camera 212, the floodlight 214, the RGB camera 216 and the laser light 218. The laser camera 212 may be an infrared camera, and may be configured to obtain an infrared image. The floodlight 214 may be a surface light source that can emit infrared light. The laser light 218 may be a point light source with a pattern that can emit laser light. The laser camera 212 may obtain the infrared image according to reflected light when the floodlight 214 is the surface light source. The laser camera 212 may obtain a speckle image according to reflected light when the laser light 218 is the point light source. The speckle image is an image with a distorted pattern after a laser having a pattern and emitted by the laser light 218 is reflected.

The first processing unit 230 may be coupled to the RGB camera 216 and the laser camera 212 through signal lines respectively. The RGB camera 216 may send the synchronization signal to the first processing unit 230 in response to collecting each image. The first processing unit 230 may obtain an exposure time period of the laser camera 212 and an exposure time period of the RGB camera 216 after receiving the synchronization signal sent by the RGB camera 216, and calculate a delay time period according to the exposure time period of the laser camera 212 and the exposure time period of the RGB camera 216. The first processing unit 230 may forward the synchronization signal to the laser camera 212 through the signal line in response to a time period of receiving the synchronization signal reaching the delay time period. The laser camera 212 may receive the synchronization signal, start exposure and collect the infrared image, the speckle or the like according to the synchronization signal.

The second processing unit 220 may include a CPU kernel operating under a trusted execution environment (TEE) and a CPU kernel operated under a rich execution environment (REE). Both the TEE and the REE are operation modes of an advanced RISC machines (ARM) module. The REE has a higher security level. The second processing unit 220 only has one CPU kernel which may operate under the TEE at the same time. In general, an operation behavior with a high security level in the electronic device 200 needs to be executed in the CPU kernel under the TEE. An operation behavior with a low security level may be executed in the CPU kernel under the REE.

The first processing unit 230 includes a pulse width modulation (PWM) module 232, a serial peripheral interface/inter-integrated circuit (SPI/I2C) interface 234, a random access memory (RAM) module 236 and a depth engine 238. The PWM module 232 may emit pulses to the camera module, to control the floodlight 214 or the laser light 218 to be turned on, such that the laser camera 212 may collect the infrared image or the speckle image. The SPI/I2C interface 234 may be configured to receive the image collection instruction sent by the second processing unit 220. The depth engine 238 may process the speckle image to obtain a depth visual image.

When the second processing unit 220 receives the data obtaining request of an application, for example, when the application needs to perform face unlocking or face payment, the image collection instruction may be sent to the first processing unit 230 through the CPU kernel operating under the TEE. When the first processing unit 230 receives the image collection instruction, the PWM module 232 may emit pulses to control the floodlight 214 and the laser light 218 in the camera module 210 to be turned on, such that the infrared image and the speckle image are collected by the laser camera 212. The camera module 210 may send the collected infrared image and the collected speckle image to the first processing unit 230. The first processing unit 230 may process the received infrared image to obtain an infrared parallax map and process the received speckle image to obtain a speckle parallax map or a depth parallax map. The first processing unit 230 processes the received infrared image and the received speckle image as follows. The first processing unit 230 performs correction on the received infrared image or the received speckle image, to remove influences caused by internal parameters and external parameters in the camera module 210 on the received images. The first processing unit 230 may be set to different modes, and different images are outputted in different modes. When the first processing unit 230 is set to a speckle image mode, the first processing unit 230 processes the speckle image to obtain the speckle parallax map, according to which, a target speckle image may be obtained. When the first processing unit 230 is set to a depth image mode, the first processing unit 230 processes the speckle image to obtain a depth parallax map, according to which, a depth image may be obtained. The depth image refers to an image with depth information. The first processing unit 230 may send the infrared parallax map and the speckle parallax map to the second processing unit 220. The first processing unit 230 may also send the infrared parallax map and the depth parallax map to the second processing unit 220. The second processing unit 220 may obtain the target infrared image according to the infrared parallax map and obtain the depth image according to the depth parallax map. Further, the second processing unit 220 may perform face recognition, face matching and living body detection, and obtain depth information of the detected face according to the target infrared image and the depth image.

The first processing unit 230 communicates with the second processing unit 220 through a fixed security interface, to ensure security for transmitting data. As illustrated in FIG. 9, the second processing unit 220 sends data to the first processing unit 230 through a SECURE SPI/I2C 240, and the first processing unit 230 sends data to the second processing unit 220 through a SECURE mobile industry processor interface (MIPI) 250.

In an embodiment, the first processing unit 230 may also obtain the target infrared image according to the infrared parallax map and calculate the depth image according to the depth parallax map, and then send the target infrared image and the depth image to the second processing unit 220.

FIG. 3 is a block diagram illustrating an electronic device in an embodiment. As illustrated in FIG. 3, the electronic device 300 includes a processor 310, a memory 320, a display 330 and an input apparatus 340 coupled via a system bus 350. The memory 320 may include a non-volatile storage medium 322 and an internal memory 324. The non-volatile storage medium 322 of the electronic device 300 has an operating system 3222 and a computer program 3224 stored thereon. The computer program 3224 is configured to implement a method for controlling image capturing provided in embodiments of the present disclosure when executed by the processor 310. The processor 310 is configured to provide computing and controlling ability to support operation of the entire electronic device 300. The internal memory 324 in the electronic device 300 provides environment for executing the computer program 3224 in the non-volatile storage medium 322. The display 330 of the electronic device 300 may be a liquid crystal display, an electronic ink display or the like. The input apparatus 340 may be a touch layer on the display 330, a keypad, a trackball or a touchpad provided on the housing of the electronic device 300, or an external keyboard, a touchpad, a mouse or the like. The electronic device 300 may be a telephone, a tablet, a personal digital assistant, a wearable device or the like. It should be understood by those skilled in the art that, the structure illustrated in FIG. 3 is merely a block diagram of a part of the electronic device related to the technical solution of the present disclosure, which is not construed to limit the electronic device to which the technical solution of the present disclosure is applied. A detailed electronic device may include more or fewer components than those shown in the FIG. 3, some components may be combined, or components may be arranged in a different manner.

Figure 10:
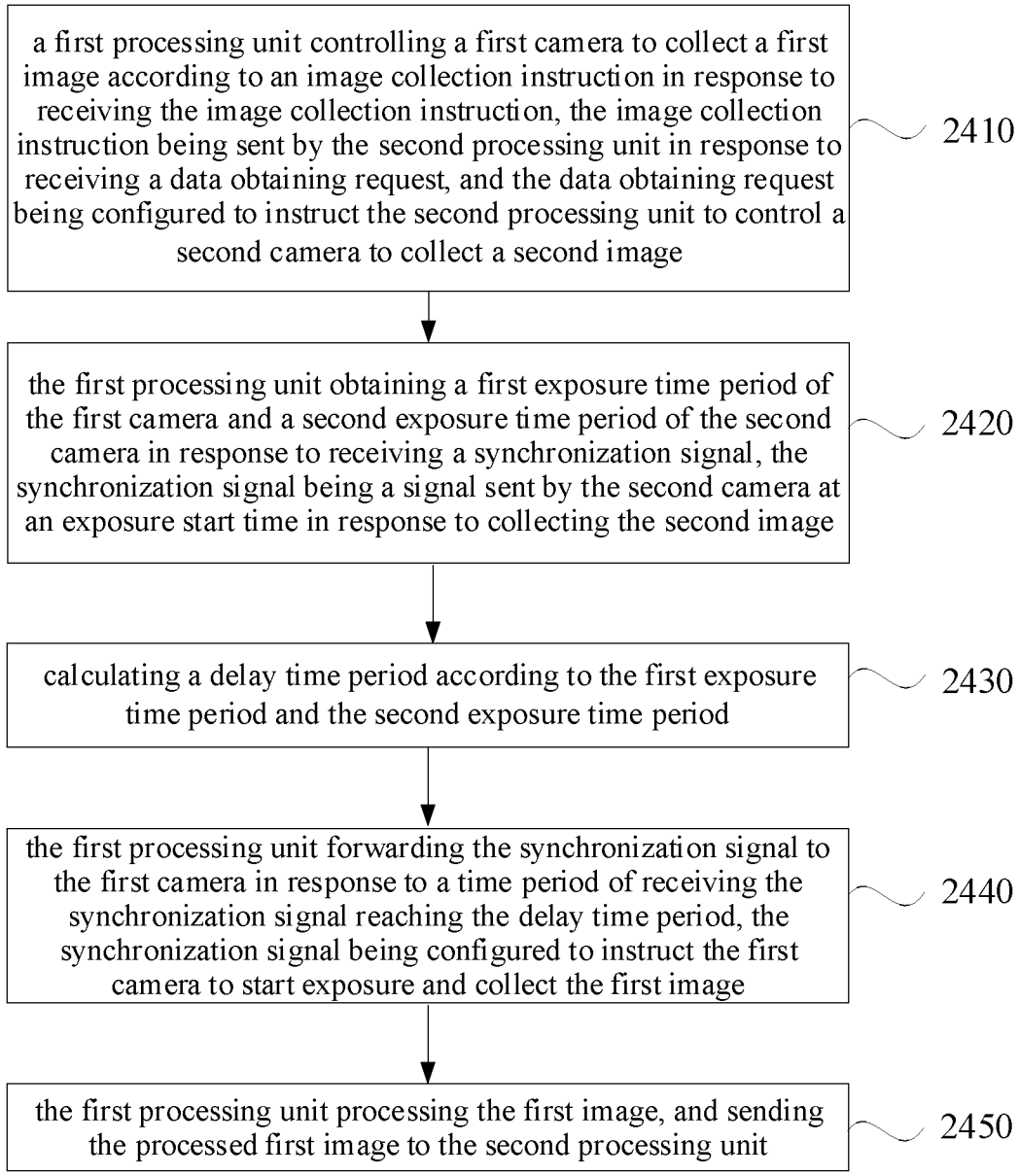
FIG. 10 is a flow chart illustrating a method for controlling image capturing in an embodiment.

As illustrated in FIG. 10, in an embodiment, a method for controlling image capturing is provided. The method includes following blocks.

At block 2410, a first processing unit controls a first camera to collect a first image according to an image collection instruction in response to receiving the image collection instruction. The image collection instruction is sent by the second processing unit in response to receiving a data obtaining request. The data obtaining request is configured to instruct the second processing unit to control a second camera to collect a second image.

The first camera may be controlled to be turned on and to collect the first image when an application in an electronic device needs to obtain face data. The face data may include, but is not limited to, data for face verification in a scenario such as face unlocking and face payment, face depth information and the like. The first camera may be a laser camera. The laser camera may collect invisible light images with different wavelengths. The first image may include, but is not limited to, an infrared image, a speckle image and the like. The speckle image refers to an infrared image having a speckle pattern.

When the application needs to obtain the face data, the application may send the data obtaining request to the second processing unit. The second processing unit may send the image collection instruction to the first processing unit after receiving the data obtaining request. The first processing unit may be an MCU module. The second processing unit may be a CPU module. Alternatively, the second processing unit may firstly detect whether the data obtaining request includes a visible light image obtaining instruction. When the data obtaining request includes the visible light image obtaining instruction, it may indicate that the application needs to obtain a visible light image including a face while obtaining the face data. When the data obtaining request includes the visible light image obtaining instruction, the second processing unit may control the second camera to collect the second image according to the visible light image obtaining instruction. The second camera may be an RGB camera. The second image may be an RGB image including the face.

The first processing unit may control the first camera to collect the first image according to the image collection instruction after receiving the image collection instruction. The first image may include an infrared image, a speckle image and the like. The first processing unit may control to turn on a floodlight in a camera module and collect the infrared image through the laser camera. The first processing unit may control to turn on a laser such as a laser light in the camera module and collect the speckle image through the laser camera. The floodlight may be a point light source irradiating uniformly in all directions. Light rays emitted by the floodlight may be infrared light. The laser camera may collect the face to obtain the infrared image. Diffraction may be performed on laser lights emitted by the laser through a lens and a diffractive optical element (DOE) to generate an image having speckle particles. The image having speckle particles is projected to a target object. Shift of the speckle pattern may be generated since distances between respective points of the target object and the electronic device are different. The laser camera captures the target object to obtain the speckle image.

At block 2420, the first processing unit obtains a first exposure time period of the first camera and a second exposure time period of the second camera are obtained in response to receiving a synchronization signal. The synchronization signal is a signal sent by the second camera at an exposure start time in response to collecting the second image.

The first processing unit may be coupled to the first camera through a control line, and control the first camera to collect the first image through the control line. The second processing unit may be coupled to the second camera through a control line, and control the second camera to collect the second image through the control line. The first processing unit may be coupled to the second processing unit. The first processing unit may also be coupled to the first camera and the second camera respectively through a signal line. The signal line may be a synchronization signal line.

The second camera may send the synchronization signal to the second processing unit connecting the signal line at the exposure start time in response to collecting each image. The synchronization signal may be a start of frame (SOF), and may be configured to each frame for starting exposure. The first processing unit may obtain the first exposure time period of the first camera and the second exposure time period of the second camera in response to receiving the synchronization signal sent by the second camera. The exposure time period may refer to a photosensitive time period. The longer the exposure time period is, the more light is incident. Usually, the first exposure time period of the first camera is quite different from the second exposure time of the second camera. The first exposure time period of the first camera may be lower than the second exposure time period of the second camera. However, it is not limited thereto, and there may be a case where the first exposure time period of the first camera is greater than the second exposure time period of the second camera.

At block 2430, a delay time period is calculated according to the first exposure time period and the second exposure time period.

The first processing unit may calculate the delay time period according to the first exposure time period of the first camera and the second exposure time period of the second camera. The delay time period may refer to that a time span for which exposure start of the first camera is delayed. By delaying the time point at which the first camera starts exposure, it may ensure that the first camera is synchronized with the second camera.

In an embodiment, the electronic device may preset a time point at which the first camera is synchronized with the second camera during an exposure process. The synchronous time point during the exposure process may refer to that, a ratio of a time period that has elapsed since the first camera starts exposure to the first exposure time period is equal to a ratio of a time period that has elapsed since the second camera starts exposure to the second exposure time period. For example, it may be set that the first camera and the second camera end the exposure simultaneously, or the first camera at half of the first exposure time period is consistent with the second camera at half of the second exposure time period, or the first camera at ¾ of the first exposure time period is consistent with the second camera at ¾ of the second exposure time period. The first processing unit may calculate the delay time period according to the first exposure time period, the second time period and the synchronous time point during the exposure process.

At block 2440, the first processing unit forwards the synchronization signal to the first camera in response to a time period of receiving the synchronization signal reaching the delay time period. The synchronization signal is configured to instruct the first camera to start exposure and collect the first image.

After calculating the delay time period, the first processing unit may forward the synchronization signal to the first camera in response to a time period of receiving the synchronization signal reaching the delay time period. The first camera starts exposure in response to receiving the synchronization signal, such that the first camera and the second camera are synchronized at the same time during the exposure process. For example, the electronic device may preset that the first camera is consistent with the second camera at half of the exposure, then the first processing unit calculates the delay time period, and forwards the synchronization signal to the first camera in response to the time period of receiving the synchronization signal reaching the delay time period, such that the second camera is also half exposed while the first camera is half exposed, and the two cameras keep consistent.

At block 2450, the first image is processed by the first processing unit, and the processed first image is sent to the second processing unit.

The first camera may send the collected first image to the first processing unit. The first processing unit may process the first image. The first processing unit may be set in different modes. The first processing unit may collect different first images in different modes, and perform different processes on the first image. When the first processing unit is in an infrared mode, the first processing unit may control to turn on the floodlight, collect an infrared image through the first camera, and process the infrared image to obtain an infrared parallax map. When the first processing unit is in a speckle image mode, the first processing unit may control to turn on the laser light, collect a speckle image through the first camera, and process the speckle image to obtain a speckle parallax map. When the first processing unit is in a depth image mode, the first processing unit may process the speckle image to obtain a depth parallax map.

In an embodiment, the first processing unit may perform correction on the first image. Performing the correction refers to correct image content offset of the first image caused by internal parameters and external parameters of the first camera and the second camera, such as image content offset caused by a deflection angle of the laser camera, and position layout between the laser camera and the RGB camera. A parallax map of the first image may be obtained after performing the correction on the first image. For example, the correction may be performed on the infrared image to obtain the infrared parallax map, and the correction may be performed on the speckle image to obtain the speckle parallax map or the depth parallax map. Performing the correction on the first image may avoid a condition that an image finally presented on the display of the electronic device appears ghosting.

The first processing unit may process the first image, and then send the processed first image to the second processing unit. The second processing unit may obtain a target image according to the processed first image, such as a target infrared image, a target speckle image, a target depth image, and the like. The second processing unit may process the target image according to requirement of the application.

For example, when the application needs to perform face verification, the second processing unit may perform face detection according to the target image and the like. The face detection may include face recognition, face matching and living body detection. The face recognition refers to recognize whether there is a face in the target image. The face matching refers to match the face in the target image with a preset face. The living body detection refers to detect whether the face in the target image is biologically active. When the application needs to obtain depth information of the face, the generated target depth image may be uploaded to the application. The application may perform image optimization process, three-dimensional modeling and the like according to the received target depth image.

In this embodiment, the first processing unit may calculate the delay time period according to the exposure time periods of the two cameras in response to receiving the synchronization signal sent by the second camera. The first processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. In this way, the time point at which the first camera is synchronized with the second camera is adjusted dynamically, such that synchronization effect is better, and it may also ensure that image content collected by the two cameras is consistent when the exposure time periods of the two cameras have a greater difference.

In an embodiment, calculating the delay time period according to the first exposure time period and the second exposure time period at block 2430 includes: calculating an exposure time difference between the first exposure time period and the second exposure time period, and dividing the exposure time difference by 2 to obtain the delay time period.

The electronic device may set that the first camera is consistent with the second camera at half of the exposure. The second camera is also half exposed while the first camera is half exposed. In response to receiving the synchronization signal sent by the second camera, the first processing unit may calculate the exposure time difference between the first exposure time period and the second exposure time period, and divide the exposure time difference by 2 to obtain the delay time period. The delay time period is $T_3=|T_1-T_2|/2$. $T_1$ represents the first exposure time period, and $T_2$ represents the second exposure time period. For example, when the first exposure time period of the first camera is 3 ms and the second exposure time period of the second camera is 30 ms, the exposure time difference between the first exposure time period and the second exposure time period may be calculated as 27 ms, and the exposure time difference may be divided by 2, to obtain the delay time period which is 13.5 ms.

Alternatively, the first processing unit may compare the exposure time difference with a time threshold after calculating the exposure time difference between the first exposure time period and the second exposure time period, and determine whether the exposure time difference is greater than the time threshold. When the exposure time difference is greater than the time threshold, the first processing unit may divide the exposure time difference by 2 to obtain the delay time period, and the first processing unit forwards the synchronization signal to the first camera in response to the time period of receiving the synchronization signal reaching the delay time period. When the exposure time difference is lower than or equal to the time threshold, the first processing unit may forward the synchronization signal to the first camera directly, and not delay the time point at which the first camera starts exposure. The time threshold may be set according to an actual requirement, such as 1 ms, 2 ms and the like, thus ensuring content of the images collected by the first camera and the second camera is within a tolerable error range, and reducing computing burden of the first processing unit.

In an embodiment, in order to ensure that the second camera is also half exposed while the first camera is half exposed, the first processing unit may also calculate a first intermediate exposure time point of the first exposure time period and a second intermediate exposure time point of the second exposure time period. The intermediate exposure time point refers to a time point at the half of the exposure process. The first processing unit may determine a difference value between the first intermediate exposure time point and the second intermediate exposure time point as the delay time period. The delay time period is $T_3=|T_1/2-T_2/2|$. $T_1$ represents the first exposure time period, and $T_2$ represents the second exposure time period. For example, when the first exposure time period of the first camera is 3 ms and the second exposure time period of the second camera is 30 ms, the first intermediate exposure time point of the first exposure time period may be calculated to be 1.5 ms firstly, the second intermediate exposure time point of the second exposure time period may be calculated to be 15 ms, the difference value between the first intermediate exposure time point and the second intermediate exposure time point may be calculated to be 13.5 ms, and the difference value 13.5 ms may be determined as the delay time period. It should be understood that, other algorithms may also be employed to ensure the synchronization between the first camera and the second camera, which is not limited.

In this embodiment, the time point at which the synchronization signal is forwarded may be adjusted dynamically according to the exposure time periods of the first camera and the second camera, such that the time point at which the first camera is synchronized with the second camera may be adjusted dynamically, which ensures that the first camera is consistent with the second camera at half of the exposure, and the synchronization effect is better.

Figure 11:
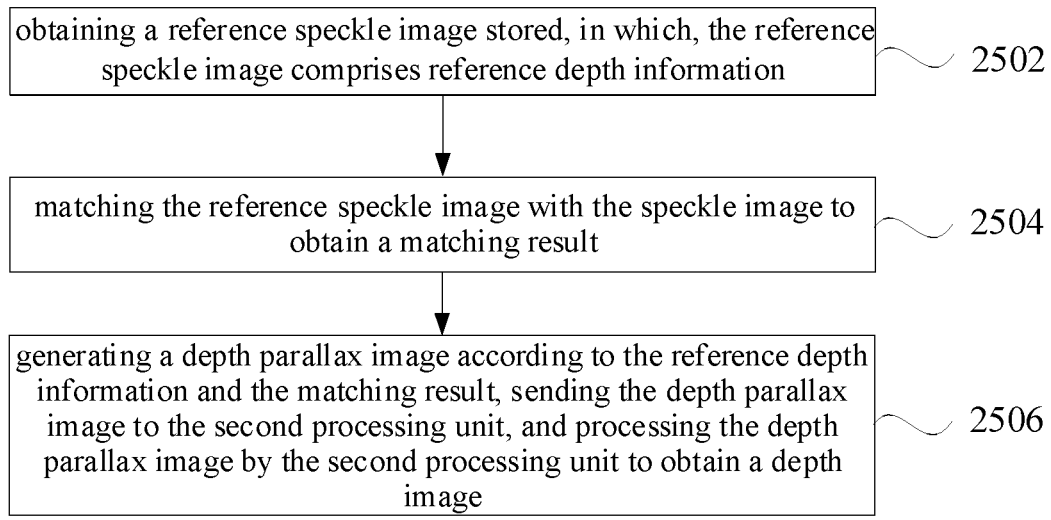
FIG. 11 is a flow chart illustrating processing a first image in an embodiment.

As illustrated in FIG. 11, in an embodiment, processing the first image by the first processing unit and sending the processed first image to the second processing unit at block 2450 includes acts in following blocks.

At block 2502, a reference speckle image stored is obtained. The reference speckle image includes reference depth information.

In a camera coordinate system, a line perpendicular to an imaging plane and passing through a center of a mirror is taken as Z axis. When a coordinate of an object in the camera coordinate system is (X, Y, Z), Z value is the depth information of the object in the imaging plane of the camera. When an application needs to obtain depth information of a face, a depth image including the depth information of the face needs to be collected. The first processing unit may control to turn on a floodlight, and collect a speckle image through a first camera. The first processing unit may store the reference speckle image in advance. The reference speckle image may have the reference depth information. Depth information of respective pixels included in the speckle image may be obtained according to the collected speckle image and the reference speckle image.

At block 2504, the reference speckle image is matched with the speckle image to obtain a matching result.

The first processing unit may take respective pixels included in the collected speckle image as the center successively, and select one pixel block with a preset size, such as a pixel block with 31 pixels*31 pixels, and search for a block in the reference speckle image which matches the selected pixel block. The first processing unit may find two points on a same laser light path respectively in the speckle image and the reference speckle image from the selected pixel block in the collected speckle image and the matched block in the reference speckle image. Speckle information of the two points on the same laser light path is consistent. The two points on the same laser light path may be identified as corresponding pixels. In the reference speckle image, depth information of the points on each laser light path is known. The first processing unit may calculate offset between the two corresponding pixels on the same laser light path in the collected speckle image and the reference speckle image, and obtain the depth information of respective pixels included in the collected speckle image according to the offset.

In an embodiment, the first processing unit calculates the offset between the collected speckle image and the reference speckle image, and obtains the depth information of respective pixels included in the speckle image according to the offset by the following formula (1).

$$Z_D = \frac{L \times f \times Z_0}{L \times f + Z_0 \times P} \quad (1)$$

$Z_D$ represents depth information of a pixel, i.e., a depth value of the pixel. L represents a distance between the laser camera and the laser. f represents a focal length of a lens in the laser camera. $Z_0$ represents a depth value between a reference plane and the laser camera of the electronic device when the reference speckle image is collected. P represents the offset between the corresponding pixels in the collected speckle image and the reference speckle image. P may be obtained by multiplying the number of offset pixels between the collected speckle image and the reference speckle image by an actual distance of one pixel. When a distance between the target object and the laser camera is greater than a distance between the reference plane and the laser camera, P is a negative value. When the distance between the target object and the laser camera is less than the distance between the reference plane and the laser camera, P is a positive value.

At block 2506, a depth parallax map is generated according to the reference depth information and the matching result, the depth parallax map is sent to the second processing unit, and the depth parallax map is processed by the second processing unit to obtain a depth image.

The first processing unit may perform correction on the collected speckle image after obtaining the depth information of respective pixels included in the collected speckle image, to correct image content offset of the collected speckle image caused by internal parameters and external parameters of the first camera and the second camera. The first processing unit may generate the depth parallax map according to the corrected speckle image and the depth values of respective pixels in the speckle image, and send the depth parallax map to the second processing unit. The second processing unit may obtain the depth image according to the depth parallax map. The depth image may include the depth information of respective pixels. The second process image may upload the depth image to the application. The application may perform image optimization, three-dimensional modeling and the like according to depth information of the face in the depth image. The second processing unit may also perform living body detection according to the depth information of the face in the depth image, which may avoid that the collected face is a plane face.

In this embodiment, the depth information of the collected image may be obtained accurately by the first processing unit, such that the efficiency for processing the data is high, and the accuracy of image processing is improved.

Figure 12:
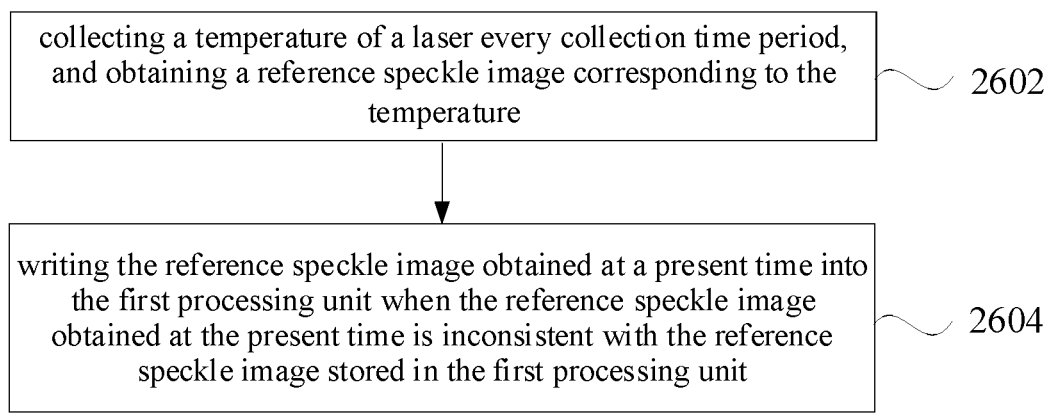
FIG. 12 is a flow chart illustrating obtaining a reference speckle image according to a temperature of a laser in an embodiment.

As illustrated in FIG. 12, in an embodiment, before obtaining the reference speckle image stored at the block 2502, the method further includes acts in following blocks.

At block 2602, a temperature of a laser is collected every collection time period, and a reference speckle image corresponding to the temperature is obtained.

An electronic device may be provided with a temperature sensor beside a laser and collect the temperature through the temperature sensor. The laser refers to a floodlight or the like. The second processing unit may obtain the temperature of the laser collected by the temperature sensor every collection time period. The collection time period may be set according to the actual requirement, such as 3 seconds, 4 seconds or the like, which is not limited thereto. As the temperature of the laser changes, a camera module may be deformed, affecting internal and external parameters of the first camera and the second camera. Effects on the camera are different under different temperatures. Therefore, reference speckle images may be different at different temperatures.

The second processing unit may obtain the reference speckle image corresponding to the temperature, and process the speckle image collected under the temperature according to the reference speckle image corresponding to the temperature, to obtain the depth image. Alternatively, the second processing unit may set lots of different temperature ranges in advance, such as 0° C.~30° C., 30° C.~60° C., 60° C.~90° C. and the like, which is not limited thereto. Different temperature ranges may correspond to different reference speckle images. After collecting the temperature, the second processing unit may determine the temperature range to which the collected temperature belongs, and obtain the reference speckle image corresponding to the temperature range.

At block 2604, the reference speckle image obtained at the present time is written into the first processing unit when the reference speckle image obtained at the present time is inconsistent with the reference speckle image stored in the first processing unit.

The second processing unit may determine whether the reference speckle image obtained at the present time is consistent with the reference speckle image stored in the first processing unit after obtaining the reference speckle image corresponding to the collected temperature. The reference speckle image may have an image identifier. The image identifier may be combined by one or more of numbers, letters, characters, etc. The second processing unit may read the image identifier of the reference speckle image stored in the first processing unit, and compare the image identifier of the reference speckle image obtained at the present time with the image identifier read from the first processing unit. When the two image identifiers are inconsistent, it indicates that the reference speckle image obtained at the present time is inconsistent with the reference speckle image stored in the first processing unit, and the second processing unit may write the reference speckle image obtained at the present time into the first processing unit. The first processing unit may store the newly written reference speckle image and delete the previously stored reference speckle image.

In this embodiment, the reference speckle image corresponding to the temperature may be obtained according to the temperature of the laser, reducing influence of the temperature on the image outputted finally, such that the obtained depth information is more accurate.

Figure 13:
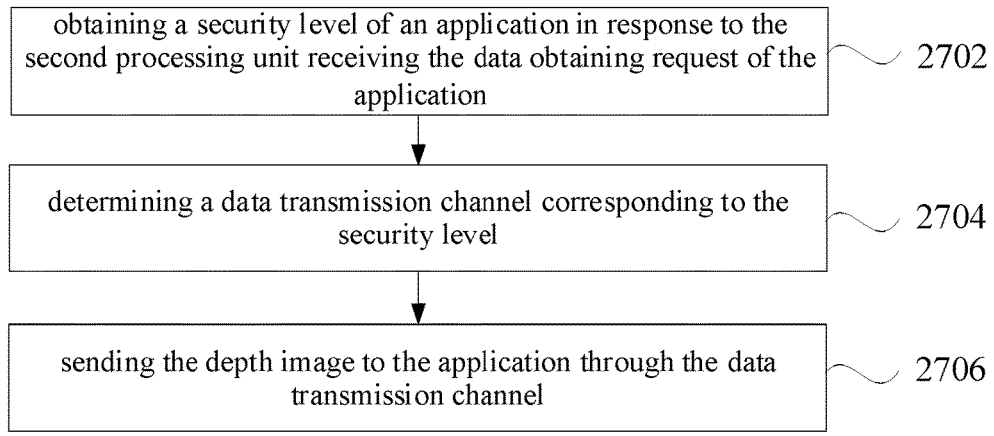
FIG. 13 is a flow chart illustrating selecting a data transmission channel according to a security level of an application in an embodiment.

As illustrated in FIG. 13, in an embodiment, the above method for controlling image capturing also includes acts in following blocks.

At block 2702, a security level of an application is obtained in response to the second processing unit receiving a data obtaining request of the application.

In an embodiment, the second processing unit in the electronic device may include two operation modes. The first operation mode may be a TEE. The TEE is a trusted execution environment, of which a security level is high. The second operation mode may be a REE. The REE is a rich execution environment, of which a security level is low. The second processing unit may send an image collection instruction to the first collection unit through the first operation mode in response to receiving the data obtaining request sent by the application. When the second processing unit has a single kernel, the single kernel may be directly switched from the second operation mode to the first operation mode. When the second processing unit has multiple kernels, one kernel may be switched from the second operation mode to the first operation mode, other kernels still operate in the second operation mode, and the image collection instruction is sent to the first processing unit through the kernel operating in the first operation mode. The first processing unit processes the collected first image, and send the processed first image to the kernel operating in the first operation mode, which may ensure that the first processing unit is always operating in the trusted execution environment, improving the security.

When the application of the electronic device sends the data obtaining request to the second processing unit, the second processing unit may obtain the application type of the application, and obtain a security level corresponding to the application type. The application type may include, but is not limited to, an unlocking application, a payment application, a camera application, an image optimization application and the like. Different application types have different security levels. For example, security levels corresponding to the payment application and the unlocking application may be high, and security levels corresponding to the camera application and the image optimization application may be low, which is not limited.

At block 2704, a data transmission channel corresponding to the security level is determined.

The second processing unit may determine the data transmission channel corresponding to the security level of the application. The data transmission channel may include, but is not limited to, a security channel and a non-security channel. The security channel may correspond to an application with a high security level. The non-security channel may correspond to an application with a low security level. For example, the payment application may correspond to the security channel, and the image optimization application may correspond to a common channel. In the security channel, the transmitted data may be encrypted, avoiding data leakage or theft.

At block 2706, the depth image is sent to the application through the corresponding data transmission channel.

The second processing unit may send the depth image to the application through the data transmission channel corresponding to the security level of the application. The depth image is sent to the application with a high security level through the security channel, which may encrypt the depth image. The depth image is sent to the application with a low security level through the common channel, which may accelerate the speed for transmitting the data. Alternatively, in addition to sending the depth image to the application, other data may also be sent to the application through a data transmission channel corresponding to the security level of the application, such as a verification result of performing the face verification, which is not limited thereto.

In an embodiment, the second processing unit may send the depth image with the accuracy corresponding to the security level to the application according to the security level of the application. The higher the accuracy is, the clearer the corresponding image is, and the more information the image includes. An application with a high security level may correspond to a depth image with a high accuracy. An application with a low security level may correspond to a depth image with a low accuracy. Alternatively, the second processing unit may adjust the image accuracy of the image data by adjusting image resolution. The higher the image resolution, the higher the image accuracy is. The lower the image resolution, the lower the image accuracy is. The image accuracy of the image data may also be adjusted by controlling the number of diffraction points of the laser light. The higher the image accuracy, the more diffraction points are, and the lower the image accuracy, the less the diffraction points are. It should be understood that, other ways may be employed to control the image accuracy, which is not limited. The accuracy of the depth image is adjusted according to the security level of the application, improving the security of the data.

In this embodiment, the corresponding data transmission channel is selected to transmit the data according to the security level of the application, improving the security for transmitting the data in the security channel.

In an embodiment, a method for controlling image capturing is provided. The method includes following steps.

At step (1), a first processing unit controls a first camera to collect a first image according to an image collection instruction in response to receiving the image collection instruction. The image collection instruction is sent by the second processing unit in response to receiving a data obtaining request. The data obtaining request is configured to instruct the second processing unit to control a second camera to collect a second image.

In an embodiment, the first processing unit is coupled to the first camera through a control line, the second processing unit is coupled to the second camera through a control line, the first processing unit is coupled to the second processing unit, and the first processing unit is coupled to the first camera and the second camera respectively through a signal line.

At step (2), the first processing unit obtains a first exposure time period of the first camera and a second exposure time period of the second camera in response to receiving a synchronization signal. The synchronization signal is a signal sent by the second camera at an exposure start time in response to collecting the second image.

At step (3), a delay time period is calculated according to the first exposure time period and the second exposure time period.

In an embodiment, step (3) includes: calculating an exposure time difference between the first exposure time period and the second exposure time period, and dividing the exposure time difference by 2 to obtain the delay time period.

In an embodiment, step (3) includes: calculating a first intermediate exposure time point of the first exposure time period and a second intermediate exposure time point of the second exposure time period; and determining a difference value between the first intermediate exposure time point and the second intermediate exposure time point as the delay time period.

At step (4), the first processing unit forwards the synchronization signal to the first camera in response to a time period of receiving the synchronization signal reaching the delay time period. The synchronization signal is configured to instruct the first camera to start exposure and to collect the first image.

At step (5), the first image is processed by the first processing unit, and the processed first image is sent to the second processing unit.

In an embodiment, step (5) includes: obtaining a reference speckle image stored, in which, the reference speckle image includes reference depth information; matching the reference speckle image with the speckle image to obtain a matching result; generating a depth parallax map according to the reference depth information and the matching result, sending the depth parallax map to the second processing unit, and processing the depth parallax map by the second processing unit to obtain a depth image.

In an embodiment, before obtaining the reference speckle image stored, the method also includes: collecting a temperature of a laser every collection time period, and obtaining a reference speckle image corresponding to the temperature; and writing the reference speckle image obtained at a present time into the first processing unit when the reference speckle image obtained at the present time is inconsistent with the reference speckle image stored in the first processing unit.

In an embodiment, the above method for controlling image capturing also include: obtaining a security level of an application in response to the second processing unit receiving the data obtaining request of the application; determining a data transmission channel corresponding to the security level; and sending the depth image to the application through the data transmission channel.

In this embodiment, the first processing unit calculates the delay time period according to the exposure time periods of the two cameras in response to receiving the synchronization signal sent by the second camera. The first processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. In this way, the time point at which the first camera is synchronized with the second camera is adjusted dynamically, such that the synchronization effect is better, and it may ensure that the image content collected by the two cameras is consistent when there is large difference between the exposure time periods of the two cameras.

It should be understood that, although respective steps in respective flow charts are sequentially displayed as indicated by the arrows, these steps are not necessarily performed in the order indicated by the arrows. Unless expressly stated in the present disclosure, there is no strict ordering for the execution of these steps, and these steps may be performed in other orders. Moreover, at least a part of the steps in the various flow charts above may include multiple sub-steps or multiple stages. Such sub-steps or stages are not necessarily executed at the same time, but may be executed at different times. Such sub-steps or stages are not necessarily executed sequentially, but may be executed in turn or alternately with at least a portion of other steps or sub-steps or stages of other steps.

In an embodiment, an electronic device is provided. The electronic device includes a first processing unit, a second processing unit and a camera module. The first processing unit is coupled to the second processing unit and the camera module respectively. The camera module may include a first camera and a second camera. The first processing unit is coupled to the first camera through a control line. The second processing unit is coupled to the second camera through a control line. The first processing unit is coupled to the second processing unit. The first processing unit is coupled to the first camera and the second camera respectively through a signal line.

The second processing unit is configured to control a second camera to collect a second image according to a data obtaining request in response to receiving the data obtaining request, and to send an image collection instruction to the first processing unit. The first processing unit is configured to control the first camera to collect the first image according to the image collection instruction in response to receiving the image collection instruction sent by the second processing unit. The second camera is configured to send a synchronization signal to the first processing unit at an exposure start time in response to collecting the second image. The first processing unit is further configured to obtain a first exposure time period of the first camera and a second exposure time period of the second camera in response to receiving the synchronization signal sent by the second camera. The first processing unit is further configured to calculate a delay time period according to the first exposure time period and the second exposure time period. The first processing unit is further configured to forward the synchronization signal to the first camera in response to a time period of receiving the synchronization signal reaching the delay time period. The first camera is configured to start exposure and to collect the first image according to the synchronization signal. The first processing unit is further configured to process the first image and to send the processed first image to the second processing unit.

In this embodiment, the first processing unit may calculate the delay time period according to the exposure time periods of the two cameras in response to receiving the synchronization signal sent by the second camera. The first processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. In this way, the time point at which the first camera is synchronized with the second camera is adjusted dynamically, such that synchronization effect is better, and it may also ensure that image content collected by the two cameras is consistent when the exposure time periods of the two cameras have a greater difference.

In an embodiment, the first processing unit is further configured to calculate an exposure time difference between the first exposure time period and the second exposure time period, and to divide the exposure time difference value by 2 to obtain the delay time period.

In an embodiment, the first processing unit is further configured to calculate a first intermediate exposure time point of the first exposure time period and a second intermediate exposure time point of the second exposure time period, and to determine a difference value between the first intermediate exposure time point and the second intermediate exposure time point as the delay time period.

In this embodiment, a time point at which the synchronization signal is forwarded may be adjusted dynamically according to the exposure time periods of the first camera and the second camera, such that the time point at which the first camera is synchronized with the second camera may be adjusted dynamically, ensuring that the first camera is consistent with the second camera at the half of the exposure process, and the synchronization effect is better.

In an embodiment, the first processing unit is further configured to obtain a reference speckle image stored, and to match the reference speckle image with the speckle image to obtain a matching result. The reference speckle image includes reference depth information.

The first processing unit is further configured to generate a depth parallax map according to the reference depth information and the matching result, and to send the depth parallax map to the second processing unit. The second processing unit is further configured to process the depth parallax map to obtain a depth image.

In this embodiment, the depth information of the collected image may be obtained accurately by the first processing unit, and thus the efficiency for processing data is improved, and the accuracy for the image processing is improved.

In an embodiment, the second processing unit is further configured to collect a temperature of a laser every collection time period, and to obtain a reference speckle image corresponding to the temperature.

The second processing unit is further configured to write the reference speckle image obtained at the present time into the first processing unit when the reference speckle image obtained at the present time is inconsistent with the reference speckle image stored in the first processing unit.

In this embodiment, the reference speckle image corresponding to the temperature may be obtained according to the temperature of the laser, reducing the influence of the temperature on a depth image outputted finally, such that the obtained depth information is more accurate.

In an embodiment, the second processing unit is further configured to obtain a security level of an application in response to receiving the data obtaining request of the application.

The second processing unit is further configured to determine a data transmission channel corresponding to the security level, and to send the depth image to the application through the data transmission channel.

In this embodiment, the corresponding data transmission channel is selected to transmit the data according to the security level of the application, improving the security for transmitting the data.

Figure 14:
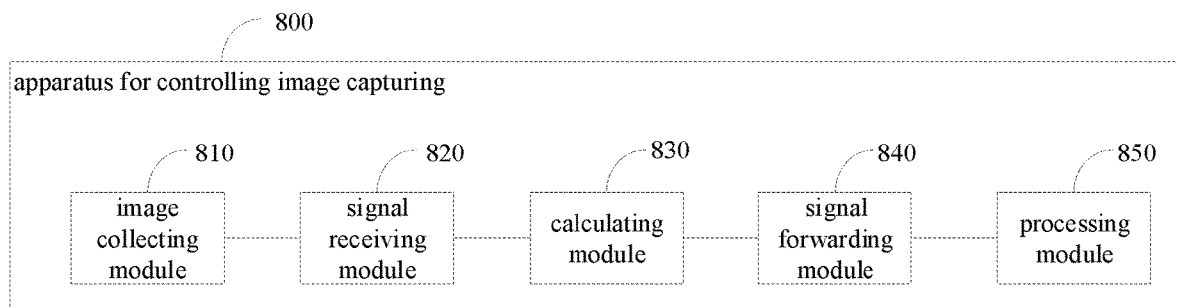
FIG. 14 is a block diagram illustrating an apparatus for controlling image capturing in an embodiment.

As illustrated in FIG. 14, in an embodiment, an apparatus 800 for controlling image capturing is provided. The apparatus includes an image collecting module 810, a signal receiving module 820, a calculating module 830, a signal forwarding module 840 and a processing module 850. The image collecting module 810 is configured to control a first camera to collect a first image according to an image collection instruction in response to a first processing unit receiving the image collection instruction. The image collection instruction is sent by the second processing unit in response to receiving a data obtaining request. The data obtaining request is configured to instruct the second processing unit to control a second camera to collect a second image. The signal receiving module 820 is configured to obtain a first exposure time period of the first camera and a second exposure time period of the second camera in response to the first processing unit receiving a synchronization signal sent by the second camera. The synchronization signal is a signal sent by the second camera at an exposure start time in response to collecting the second image. The calculating module 830 is configured to calculate a delay time period according to the first exposure time period and the second exposure time period. The signal forwarding module 840 is configured to forward the synchronization signal to the first camera in response to a time period of receiving the synchronization signal reaching the delay time period. The synchronization signal is configured to instruct the first camera to start exposure and to collect the first image. The processing module 850 is configured to process the first image by the first processing unit, and to send the processed first image to the second processing unit.

In this embodiment, the first processing unit may calculate the delay time period according to the exposure time periods of the two cameras in response to receiving the synchronization signal sent by the second camera. The first processing unit forwards the synchronization signal to the first camera in response to the time period of receiving the synchronization signal reaching the delay time period. The time point at which the synchronization signal is forwarded is adjusted dynamically according to the exposure time periods of the first camera and the second camera. In this way, the time point at which the first camera is synchronized with the second camera is adjusted dynamically, such that synchronization effect is better, and it may also ensure that image content collected by the two cameras is consistent when the exposure time periods of the two cameras have a greater difference.

In an embodiment, the calculating module 830 is further configured to calculate an exposure time difference between the first exposure time period and the second exposure time period, and to divide the exposure time difference value by 2 to obtain the delay time period.

In an embodiment, the calculating module 830 is further configured to calculate a first intermediate exposure time point of the first exposure time period and a second intermediate exposure time point of the second exposure time period, and to determine a difference value between the first intermediate exposure time point and the second intermediate exposure time point as the delay time period.

In this embodiment, the time point at which the synchronization signal is forwarded may be adjusted dynamically according to the exposure time periods of the first camera and the second camera, such that the time point at which the first camera is synchronized with the second camera may be adjusted dynamically, ensuring that the first camera is consistent with the second camera at the half of the exposure process, and the synchronization effect is better.

Figure 15:
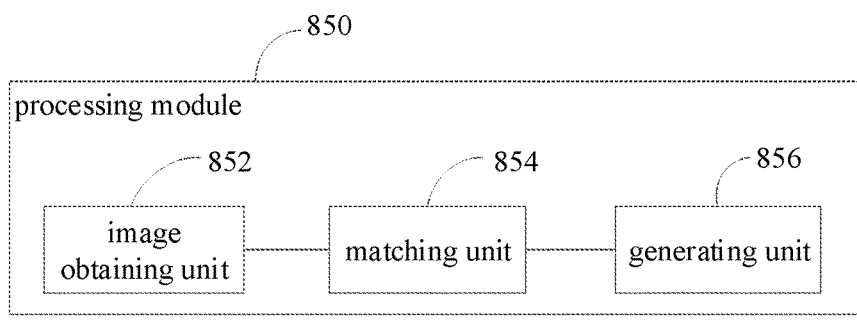
FIG. 15 is a block diagram illustrating a processing module in an embodiment.

As illustrated in FIG. 15, in an embodiment, the processing module 850 includes an image obtaining unit 852, a matching unit 854 and a generating unit 856. The image obtaining unit 852 is configured to obtain a reference speckle image stored. The reference speckle image includes reference depth information. The matching unit 854 is configured to match the reference speckle image with the speckle image to obtain a matching result. The generating unit 856 is configured to generate a depth parallax map according to the reference depth information and the matching result, and to send the depth parallax map to the second processing unit, such that the depth parallax map is processed by the second processing unit to obtain a depth image.

In this embodiment, the depth information of the collected image may be obtained by the first processing unit, such that the efficiency for processing the data is improved, and the accuracy for processing the image is improved.

In an embodiment, the above processing module 850 may further include a temperature collecting unit and a writing unit in addition to the image obtaining unit 852, the matching unit 854, and the generating unit 856.

The temperature collecting unit is configured to collect a temperature of a laser every collection time period and to obtain a reference speckle image corresponding to the temperature. The writing unit is configured to write the reference speckle image obtained at the present time into the first processing unit when the reference speckle image obtained at the present time is inconsistent with the reference speckle image stored in the first processing unit.

In this embodiment, the corresponding reference speckle image may be obtained according to the temperature of the laser, reducing the influence of the temperature on an image outputted finally, such that the obtained depth information is more accurate.

In an embodiment, the above apparatus 800 for controlling image capturing may further include a level obtaining module, a channel determining module and a sending module in addition to the image collecting module 810, the signal receiving module 820, the calculating module 830, the signal forwarding module 840, and the processing module 850. The level obtaining module is configured to obtain a security level of an application in response to the second processing unit receiving the data obtaining request of the application. The channel determining module is configured to determine a data transmission channel corresponding to the security level. The sending module is configured to send the depth image to the application through the data transmission channel.

In this embodiment, the corresponding data transmission channel is selected to transmit the data according to the security level of the application, improving the security for transmitting the data.

In an embodiment, a computer readable storage medium is provided. The computer readable storage medium is stored thereon with a computer program. When the computer program is executed by a processor, the above method for controlling image capturing is implemented.

In an embodiment, a computer program product including a computer program is provided. When the computer program product is running on a computer device, the computer device is caused to implement the above method for controlling photographing.

Those skilled in the art can understand that all or some steps in the above embodiments may be completed by relevant hardware instructed by a computer program. The program may be stored in a non-volatile computer readable storage medium. The program may include procedures of embodiments of each method described above when being executed. The storage medium may be a magnetic disk, a compact disk-read only memory (CD-ROM), a read-only memory (ROM) and the like.

Any reference to a memory, a storage medium, a database or other medium as used herein may include non-volatile and/or volatile memory. A suitable non-volatile memory can include a ROM, a programmable read-only memory (PROM), an erasable programmable read-only memory (EPROM), an electrically erasable programmable read-only memory (EEPROM), or a flash memory. The volatile memory can include a random access memory (RAM) which may act as an external cache memory. By way of illustration and not limitation, the RAM is available in many forms such as a static RAM (SRAM), a dynamic RAM (DRAM), a synchronous DRAM (S DRAM), a dual data rate SDRAM (DDRSDRAM), an enhanced SDRAM (ESDRAM), a synchlink DRAM (SLDRAM), a direct rambus RAM (DRRAM), a direct rambus dynamic RAM (DRDRAM) and a rambus dynamic RAM (RDRAM).

The technical features of the above embodiments may be combined in any manner. For a clear and detailed description, all possible combinations of the various technical features in the above embodiments are not described. However, as long as there is no contradiction in the combination of these technical features, it should be considered as within the scope of the present disclosure.

The above embodiments only express several implementations of the present application, and their description is relatively specific and detailed, but it cannot be interpreted as the limitation to the scope of the present application. It should be pointed out that for ordinary technical personnel in this field, certain deformation and improvement can be made under the premise of not deviating from the concept of the present application, which all belong to the protection scope of the present application. Therefore, the protection scope of the present application shall be subject to the attached claims.

What is claimed is:

1. A method for controlling image capturing, comprising:
controlling, by a second processing unit, a second camera to collect a second image according to a data obtaining request, and sending, by the second processing unit, an image collection instruction to a first processing unit, in response to the second processing unit receiving the data obtaining request, the image collection instruction being configured to instruct the first processing unit to control a first camera to collect a first image;

obtaining, by the second processing unit, a first exposure time period of the first camera and a second exposure time period of the second camera in response to the second processing unit receiving a synchronization signal, the synchronization signal being a signal sent by the second camera at an exposure start time in response to the second camera collecting the second image;

calculating, by the second processing unit, a delay time period according to the first exposure time period and the second exposure time period;

forwarding, by the second processing unit, the synchronization signal to the first camera in response to a time period of receiving the synchronization signal reaching the delay time period, the synchronization signal being configured to instruct the first camera to start exposure and collect the first image; and processing, by the first processing unit, the first image and sending the processed first image to the second processing unit, wherein sending the image collection instruction to the first processing unit comprises:
sending the image collection instruction to the first processing unit by a kernel of the second processing unit operating in a first operation mode, the first operation mode being a trusted execution environment; and sending the processed first image to the second processing unit comprises:
sending the processed first image by the first processing unit to the kernel of the second processing unit operating in the first operation mode.

2. The method of claim 1, wherein calculating the delay time period according to the first exposure time period and the second exposure time period comprises:
calculating an exposure time difference between the first exposure time period and the second exposure time period, and dividing the exposure time difference by 2 to obtain the delay time period.

3. The method of claim 1, wherein calculating the delay time period according to the first exposure time period and the second exposure time period comprises:
calculating a first intermediate exposure time point of the first exposure time period and a second intermediate exposure time point of the second exposure time period; and
determining a difference value between the first intermediate exposure time point and the second intermediate exposure time point as the delay time period.

4. The method of claim 1, wherein sending the processed first image to the second processing unit comprises:
obtaining an application type of an application sending the data obtaining request;
determining a security level of the application according to the application type;
selecting a data transmission channel corresponding to the security level;
sending the processed first image by the first processing unit to the kernel of the second processing unit operating in the first operation mode in response to the data transmission channel being a security channel; and
sending the processed first image by the first processing unit to a camera driver in a second operation mode in response to the data transmission channel being a non-security channel, the second operation mode being a rich execution environment.

5. The method of claim 1, further comprising:
obtaining a security level of an application sending the data obtaining request;
determining an image accuracy corresponding to the security level; and
sending image data corresponding to the image accuracy to the application.

6. The method of claim 1, wherein the first image comprises a speckle image; and processing the first image by the first processing unit and sending the processed first image to the second processing unit comprises:
obtaining a reference speckle image stored, in which, the reference speckle image comprises reference depth information;
matching the reference speckle image with the speckle image to obtain a matching result; and
generating a depth parallax map according to the reference depth information and the matching result, sending the depth parallax map to the second processing unit, and processing the depth parallax map by the second processing unit to obtain a depth image.

7. An electronic device, comprising a first processing unit, a second processing unit and a camera module, wherein, the first processing unit is coupled to the second processing unit and the camera module respectively, the camera module comprises a first camera and a second camera, the first processing unit is coupled to the first camera via a control line, the second processing unit is coupled to the second camera via a control line, the first processing unit is coupled to the second processing unit, and the second processing unit is coupled to the first camera and the second camera respectively via a signal line;

the second processing unit is configured to control the second camera to collect a second image according to a data obtaining request, and send an image collection instruction to the first processing unit in response to receiving the data obtaining request;

the first processing unit is configured to control the first camera to collect a first image according to the image collection instruction;

the second camera is configured to send a synchronization signal to the second processing unit at an exposure start time in response to the second camera collecting the second image;

the second processing unit is further configured to obtain a first exposure time period of the first camera and a second exposure time period of the second camera in response to receiving the synchronization signal sent by the second camera, and calculate a delay time period according to the first exposure time period and the second exposure time period;

the second processing unit is further configured to forward the synchronization signal to the first camera in response to a time period of receiving the synchronization signal reaching the delay time period;

the first camera is configured to start exposure and to collect the first image according to the synchronization signal;

the first processing unit is further configured to process the first image and to send the processed first image to the second processing unit;

the second processing unit is further configured to send the image collection instruction to the first processing unit by a kernel of the second processing unit operating in a first operation mode, in which, the first operation mode is a trusted execution environment; and the first processing unit is further configured to send the processed first image to the kernel of the second processing unit operating in the first operation mode.

8. The electronic device of claim 7, wherein, the second processing unit is configured to calculate an exposure time difference between the first exposure time period and the second exposure time period, and divide the exposure time difference by 2 to obtain the delay time period.

9. The electronic device of claim 7, wherein, the second processing unit is configured to calculate a first intermediate exposure time point of the first exposure time period and a second intermediate exposure time point of the second exposure time period, and determine a difference value between the first intermediate exposure time point and the second intermediate exposure time point as the delay time period.

10. The electronic device of claim 7, wherein, the second processing unit is further configured to: obtain an application type of an application sending the data obtaining request, to determine a security level of the application according to the application type, and select a data transmission channel corresponding to the security level;

the first processing unit is further configured to send the processed first image to the kernel of the second processing unit operating in the first operation mode in response to the data transmission channel being a security channel; and the first processing unit is further configured to send the processed first image to a camera driver in a second operation mode in response to the data transmission channel being a non-security channel, in which, the second operation mode is a rich execution environment.

11. The electronic device of claim 7, wherein, the second processing unit is further configured to obtain a security level of an application sending the data obtaining request, determine an image accuracy corresponding to the security level, and send image data corresponding to the image accuracy to the application.

12. The electronic device of claim 7, wherein the first image comprises a speckle image;

wherein the first processing unit is further configured to obtain a reference speckle image stored, in which, the reference speckle image comprises reference depth information;

wherein the first processing unit is further configured to match the reference speckle image with the speckle image to obtain a matching result;

wherein the first processing unit is further configured to generate a depth parallax map according to the reference depth information and the matching result, and send the depth parallax map to the second processing unit; and wherein the second processing unit is further configured to process the depth parallax map to obtain a depth image.

13. An electronic device, comprising a first processing unit, a second processing unit and a camera module, wherein, the first processing unit is coupled to the second processing unit and the camera module respectively, the camera module comprises a first camera and a second camera, the first processing unit is coupled to the first camera via a control line, the second processing unit is coupled to the second camera via a control line, the first processing unit is coupled to the second processing unit, and the first processing unit is coupled to the first camera and the second camera respectively via a signal line;

the second processing unit is configured to: in response to receiving a data obtaining request, control the second camera to collect a second image according to the data obtaining request, and to send an image collection instruction to the first processing unit;

the first processing unit is configured to control the first camera to collect a first image according to the image collection instruction in response to receiving the image collection instruction sent by the second processing unit;

the second camera is configured to send a synchronization signal to the first processing unit at an exposure start time in response to collecting the second image;

the first processing unit is further configured to obtain a first exposure time period of the first camera and a second exposure time period of the second camera in response to receiving the synchronization signal sent by the second camera;

the first processing unit is further configured to calculate a delay time period according to the first exposure time period and the second exposure time period;

the first processing unit is further configured to forward the synchronization signal to the first camera in response to a time period of receiving the synchronization signal reaching the delay time period;

the first camera is configured to start exposure and to collect the first image according to the synchronization signal;

the first processing unit is further configured to process the first image and to send the processed first image to the second processing unit;

the second processing unit is further configured to send the image collection instruction to the first processing unit by a kernel of the second processing unit operating in a first operation mode, in which, the first operation mode is a trusted execution environment; and the first processing unit is further configured to send the processed first image to the kernel in the second processing unit operating in the first operation mode.

14. The electronic device of claim 13, wherein, the first processing unit is configured to calculate an exposure time difference between the first exposure time period and the second exposure time period, and to divide the exposure time difference value by 2 to obtain the delay time period.

15. The electronic device of claim 13, wherein, the first processing unit is configured to: calculate a first intermediate exposure time point of the first exposure time period and a second intermediate exposure time point of the second exposure time period; and determine a difference value between the first intermediate exposure time point and the second intermediate exposure time point as the delay time period.

16. The electronic device of claim 13, wherein,
the first camera is a laser camera and configured to collect a speckle image;
the first processing unit is further configured to obtain a reference speckle image stored, and match the reference speckle image with the speckle image to obtain a matching result, in which, the reference speckle image comprises reference depth information;
the first processing unit is further configured to generate a depth parallax map according to the reference depth information and the matching result, and send the depth parallax map to the second processing unit; and the second processing unit is further configured to process the depth parallax map to obtain a depth image.

17. The electronic device of claim 16, wherein, the second processing unit is further configured to: collect a temperature of a laser every collection time period and obtain a reference speckle image corresponding to the temperature; and the second processing unit is further configured to write the reference speckle image corresponding to the temperature into the first processing unit in response to the reference speckle image corresponding to the temperature being inconsistent with the reference speckle image stored in the first processing unit.

18. The electronic device of claim 16, wherein, the second processing unit is further configured to obtain a security level of an application in response to receiving a data obtaining request of the application; and the second processing unit is further configured to determine a data transmission channel corresponding to the security level, and to send the depth image to the application through the data transmission channel.

* * * * *